(12) United States Patent
Tatsuwaki et al.

(10) Patent No.: US 9,873,460 B2
(45) Date of Patent: Jan. 23, 2018

(54) VEHICLE BODY STRUCTURE

(71) Applicant: HONDA MOTOR CO., LTD., Tokyo (JP)

(72) Inventors: Masaaki Tatsuwaki, Wako (JP); Patrick Ellison, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/045,595

(22) Filed: Feb. 17, 2016

(65) Prior Publication Data

US 2016/0236714 A1 Aug. 18, 2016

(30) Foreign Application Priority Data

Feb. 18, 2015 (JP) .................................. 2015-029529

(51) Int. Cl.
  *B62D 25/14* (2006.01)
  *B62D 25/20* (2006.01)
(52) U.S. Cl.
  CPC ......... *B62D 25/14* (2013.01); *B62D 25/2036* (2013.01); *B62D 25/2045* (2013.01)
(58) Field of Classification Search
  CPC ............... B62D 25/14; B62D 25/2009; B62D 25/2018; B62D 25/2036; B62D 25/2045
  See application file for complete search history.

(56) References Cited

U.S. PATENT DOCUMENTS

| | | | | |
|---|---|---|---|---|
| 5,806,918 A * | 9/1998 | Kanazawa | ............ | B62D 21/07 296/187.09 |
| 6,203,099 B1 * | 3/2001 | Iwatsuki | ................ | B62D 21/10 296/204 |
| 6,270,153 B1 * | 8/2001 | Toyao | .................... | B62D 21/06 296/204 |
| 6,547,318 B2 * | 4/2003 | Takeuchi | ............. | B62D 25/082 296/193.01 |
| 6,679,546 B2 * | 1/2004 | Mishima | ................ | B62D 25/06 296/203.01 |
| 6,830,289 B2 * | 12/2004 | Miyabayashi | ....... | B62D 25/082 296/193.07 |
| 6,860,547 B2 * | 3/2005 | Winter | ................. | B62D 21/155 180/90 |

(Continued)

FOREIGN PATENT DOCUMENTS

| | | | | |
|---|---|---|---|---|
| AT | WO 2017046217 A2 * | 3/2017 | ............. | B62D 25/02 |
| DE | 2946487 A1 * | 5/1981 | ......... | B60H 1/00535 |

(Continued)

*Primary Examiner* — Glenn Dayoan
*Assistant Examiner* — Paul Chenevert
(74) *Attorney, Agent, or Firm* — Westerman, Hattori, Daniels & Adrian, LLP

(57) ABSTRACT

A vehicle body structure includes a left tunnel frame extending along a floor tunnel to a dash lower panel, a left dash frame extending upward from a front end of the left tunnel frame to a dash upper panel, and a dash cross member extending in a vehicle-body width direction and across the left dash frame. The left dash frame is provided on a vehicle-cabin-side surface of the dash lower panel. The dash cross member is provided on an engine-room-side surface of the dash lower panel. The dash cross member bridges a left front pillar and a right front pillar.

20 Claims, 15 Drawing Sheets

(56) References Cited

U.S. PATENT DOCUMENTS

| | | | | |
|---|---|---|---|---|
| 6,981,736 B2 * | 1/2006 | Morsch | | B62D 25/2018 |
| | | | | 296/187.03 |
| 7,059,667 B2 * | 6/2006 | Tomita | | B62D 25/2018 |
| | | | | 296/203.03 |
| 7,118,167 B2 * | 10/2006 | Nakamura | | B62D 21/10 |
| | | | | 296/193.07 |
| 7,832,795 B2 * | 11/2010 | Yokoi | | B62D 25/2018 |
| | | | | 296/193.02 |
| 8,075,047 B2 * | 12/2011 | Yamada | | B62D 25/04 |
| | | | | 296/193.09 |
| 8,702,148 B2 * | 4/2014 | Ichikawa | | B62D 25/08 |
| | | | | 180/90 |
| 8,702,158 B2 * | 4/2014 | Kihara | | B62D 25/082 |
| | | | | 296/203.02 |
| 8,757,708 B2 * | 6/2014 | Mildner | | B62D 25/082 |
| | | | | 296/187.09 |
| 8,814,248 B2 * | 8/2014 | Mildner | | B62D 25/08 |
| | | | | 296/187.08 |
| 8,870,270 B2 * | 10/2014 | Mochizuki | | B62D 25/2018 |
| | | | | 280/781 |
| 9,180,916 B2 * | 11/2015 | Nishida | | B62D 25/2036 |
| 9,266,568 B2 * | 2/2016 | Nishino | | B62D 25/2045 |
| 9,283,995 B2 * | 3/2016 | Hisazumi | | B62D 25/081 |
| 9,381,952 B2 * | 7/2016 | Furusaki | | B62D 21/152 |
| 9,643,659 B2 * | 5/2017 | Ohigashi | | B62D 25/088 |
| 2012/0119542 A1 * | 5/2012 | Mildner | | B62D 25/082 |
| | | | | 296/187.09 |
| 2016/0001817 A1 * | 1/2016 | Atsumi | | B60R 19/023 |
| | | | | 296/187.09 |
| 2016/0052561 A1 * | 2/2016 | Atsumi | | B62D 25/2018 |
| | | | | 296/187.08 |
| 2016/0207572 A1 * | 7/2016 | Natsume | | B62D 25/20 |
| 2016/0272253 A1 * | 9/2016 | Yoshida | | B62D 25/14 |

FOREIGN PATENT DOCUMENTS

| | | | | | |
|---|---|---|---|---|---|
| DE | WO 2004009429 | A1 * | 1/2004 | | B62D 25/2018 |
| DE | 102010054688 | A1 * | 6/2012 | | B62D 25/20 |
| DE | 102011114391 | A1 * | 3/2013 | | B62D 25/08 |
| FR | 1404293 | A * | 6/1965 | | B62D 21/02 |
| FR | WO 2008040920 | A1 * | 4/2008 | | B62D 25/20 |
| JP | 59096067 | A * | 6/1984 | | B62D 25/14 |
| JP | 11301524 | A * | 11/1999 | | B62D 25/2018 |
| JP | 2003300484 | A * | 10/2003 | | B62D 25/081 |
| JP | 2005119488 | A * | 5/2005 | | B62D 21/152 |
| JP | 2010105532 | A * | 5/2010 | | B62D 25/14 |
| JP | 4483592 | B2 | 6/2010 | | |
| JP | EP 2371680 | A1 * | 10/2011 | | B62D 25/14 |
| JP | 2014201112 | A * | 10/2014 | | B62D 25/2045 |
| KR | WO 2013032213 | A2 * | 3/2013 | | B62D 25/2018 |

* cited by examiner

VEHICLE BODY STRUCTURE

CROSS REFERENCES TO RELATED APPLICATIONS

The present application claims priority under 35 U.S.C. §119 to Japanese Patent Application No. 2015-029529, filed Feb. 18, 2015, entitled "Vehicle Body Structure." The contents of this application are incorporated herein by reference in their entirety.

TECHNICAL FIELD

The present disclosure relates to a vehicle body structure in which a dash lower panel is provided between a left front pillar and a right front pillar and separates a vehicle cabin and an engine room from each other.

BACKGROUND

In a known vehicle body structure, the front end of a floor tunnel is joined to a dash lower panel from the side of a vehicle cabin, an upper part of the front end of the floor tunnel is connected to a dash cross member by a connecting member, and the dash cross member extends in a vehicle-body width direction.

Furthermore, the dash cross member extending in the vehicle-body width direction bridges a left front pillar and a right front pillar, and the lower end at the front end of the floor tunnel is connected to a floor frame (see Japanese Patent No. 4483592, for example).

If the vehicle body structure according to Japanese Patent No. 4483592 encounters an accident with front collision and a power source (for example, an engine) provided in its engine room is moved toward the vehicle-body rear side and bumps against the dash cross member, a load is applied to the dash cross member horizontally toward the vehicle-body rear side.

The load applied to the dash cross member is transmitted through the connecting member to the upper part of the front end of the floor tunnel and then, along sidewalls of the floor tunnel, to the lower end of the floor tunnel. That is, the horizontally acting load applied to the dash cross member is converted into a load acting downward and outward in the vehicle-body width direction.

Furthermore, the load transmitted to the lower end of the floor tunnel is transmitted along the floor frame toward the vehicle-body rear side. That is, the load acting downward and outward in the vehicle-body width direction and reaching the lower end of the floor tunnel is converted into a load acting horizontally toward the vehicle-body rear side.

Thus, a load applied to the dash cross member is transmitted to and borne by the connecting member, the floor tunnel, and the floor frame, whereby the deformation of the dash lower panel is suppressed.

In the vehicle body structure according to Japanese Patent No. 4483592, a load applied to the dash cross member is converted into a load acting downward and outward in the vehicle-body width direction, and the load having reached the lower end of the floor tunnel is further converted into a load acting horizontally toward the vehicle-body rear side.

Hence, considering the bending moment occurring in a portion where the load is redirected, the size of the portion where the load is redirected needs to be increased. Such a situation makes it difficult to suppress the increase in the weight of the vehicle body structure. In this respect, there is still room for improvement.

SUMMARY

One embodiment of the present application describes a vehicle body structure in which the deformation of a dash lower panel is suppressed while the weight of the vehicle body structure is reduced.

According to an aspect of the present application, there is provided a vehicle body structure in which a dash lower panel is provided between a left front pillar and a right front pillar, a dash upper panel is provided at an upper end of the dash lower panel, the dash lower panel separates a vehicle cabin and an engine room from each other in a vehicle-body front-back direction, and a floor panel is provided on a side of the vehicle cabin. The vehicle body structure includes a tunnel frame extending along a floor tunnel included in the floor panel to the dash lower panel, a dash frame extending upward from a front end of the tunnel frame to the dash upper panel along a vehicle-cabin-side surface of the dash lower panel, and a dash cross member extending in a vehicle-body width direction and across the dash frame. The dash cross member is provided on an engine-room-side surface of the dash lower panel. The dash cross member bridges the left front pillar and the right front pillar.

According to the above aspect of the present application, the dash frame is firmly supported by the tunnel frame and the dash upper panel while the dash cross member extends in the vehicle-body width direction across the dash frame.

Therefore, if a power source (for example, an engine) provided in the engine room is moved rearward in an accident with front collision, the power source bumps against the dash cross member, whereby a load is applied to the dash cross member. The load thus applied to the dash cross member is transmitted to the dash frame.

Note that the dash frame is firmly supported by the tunnel frame and the dash upper panel. Since the load transmitted to the dash frame is borne by the dash frame, the deformation of the dash lower panel is suppressed.

That is, the deformation of the dash lower panel is suppressed by employing a simple configuration in which the dash cross member extends across the dash frame. Thus, the weight of the vehicle body structure is reduced.

Furthermore, since the dash frame extends upward to the dash upper panel, the dash upper panel is reinforced by the dash frame. Thus, the stiffness of the dash upper panel is increased, and vibrations of the windshield supported by the dash upper panel are suppressed.

The above vehicle body structure may further include a front side frame provided in the engine room and extending in the vehicle-body front-back direction, the front side frame being connected to the dash cross member; and a bulkhead connected to the front side frame and provided in a space defined inside the dash cross member in cross-sectional view of the dash cross member.

In such a configuration, a load applied to the front side frame in an accident with front collision is borne by the bulkhead. Since the bulkhead is provided in the space defined inside the dash cross member, the squashing of the dash dross member in the cross-sectional direction is suppressed by the bulkhead.

Particularly, if the inner wall and the outer wall of the front side frame are connected to the inner wall and the outer wall, respectively, of the bulkhead, the load applied to the front side frame is transmitted to the inner wall and the outer wall of the bulkhead. Thus, the load applied to the front side frame is more effectively borne by the bulkhead.

Furthermore, since the bulkhead is connected to the front side frame, the strength at the connection between the dash cross member and the front side frame is increased. Thus, while a through hole that receives a steering shaft is provided near the connection between the dash cross member and the front side frame, a satisfactory level of stiffness is imparted to the connection.

In the above vehicle body structure, the dash frame may be one of a pair of dash frames that are provided on left and right sides, respectively, at an interval in the vehicle-body width direction, and the dash frames may diverge in the vehicle-body width direction from a front end of the tunnel frame toward the dash upper panel.

In such a configuration, the pair of dash frames are arranged in such a manner as to diverge in the vehicle-body width direction.

The power source (for example, an engine) provided in the engine room may have projections on the rear face thereof, and the projections may be arranged at intervals in the vehicle-body width direction. Hence, arranging the pair of dash frames in such a manner as to diverge in the vehicle-body width direction allows the pair of dash frames to receive any projections of the power source.

Therefore, if the power source is moved rearward in an accident with front collision, the projections of the power source are made to bump against the dash frames. Thus, a load applied from the projections of the power source is borne by the dash frames.

In the above vehicle body structure, the dash lower panel may include a vertical panel portion hanging down from the dash upper panel to a front end of the floor tunnel, an inclined panel portion extending from a lower end of the vertical panel portion to the floor panel while descending toward a vehicle-body rear side, and a bent part defined at a point where the inclined panel portion and the vertical panel portion meet. Furthermore, the vehicle body structure may include a reinforcing member provided to the dash lower panel in such a manner as to cover the bent part from the side of the vehicle cabin and to provide a cross-sectionally closed space in combination with the dash lower panel.

In such a configuration, the presence of the closed space reinforces the inclined panel portion, and a satisfactory level of stiffness is imparted to the inclined panel portion (i.e., the toeboard).

Hence, the deformation of the inclined panel portion provided at the feet of occupants is suppressed.

In the above vehicle body structure, the dash lower panel may include a wheel arch portion that bulges toward the vehicle cabin in such a manner as to avoid a wheel. Furthermore, the vehicle body structure may include a tire-load-bearing portion provided to the wheel arch portion and integrated with the reinforcing member.

In such a configuration, the wheel arch portion is reinforced by the tire-load-bearing portion. Furthermore, since the tire-load-bearing portion is integrated with the reinforcing member, the tire-load-bearing portion and the reinforcing member do not need to be prepared separately, leading to a reduction in the number of components.

Furthermore, since the tire-load-bearing portion and the reinforcing member are integrated with each other, the wheel arch portion is covered by a wide member formed of the tire-load-bearing portion and the reinforcing member. Hence, if the wheel is moved rearward in an accident with oblique collision and interferes with the wheel arch portion, a load applied to the wheel arch portion from the wheel is received by the tire-load-bearing portion and the reinforcing member and is therefore dispersed over a wide area.

Thus, the deformation of the wheel arch portion toward the vehicle cabin is suppressed by the tire-load-bearing portion and the reinforcing member.

In the above vehicle body structure, the tire-load-bearing portion may include a bead that bulges toward the engine room, and the wheel arch portion may include a concave part that is concave toward the engine room and in which the bead is fitted.

In such a configuration, the tire-load-bearing portion is reinforced by the bead, and the stiffness of the tire-load-bearing portion is increased.

Furthermore, the amount of projection of the tire-load-bearing portion toward the vehicle cabin is suppressed. Thus, a space at the feet of the occupants and a space for attaching an instrument panel and other associated components are provided satisfactorily.

In the above vehicle body structure, an upper part of the tire-load-bearing portion may overlap the dash cross member with the wheel arch portion interposed between the tire-load-bearing portion and the dash cross member.

In such a configuration, a load applied to the dash cross member is transmitted to the upper part of the tire-load-bearing portion. Thus, the load applied to the dash cross member is suitably borne by the tire-load-bearing portion.

The above vehicle body structure may further include a pedal bracket provided on the dash lower panel from the side of the vehicle cabin and supporting a pedal. Furthermore, the dash cross member may include a center cross portion at a center in the vehicle-body width direction, the center cross portion being raised with respect to other portions of the dash cross member and overlapping a lower part of the pedal bracket with the dash lower panel interposed between the center cross portion and the lower part of the pedal bracket.

In such a configuration, the lower part of the pedal bracket is reinforced by using the center cross portion. Hence, even if no member that is dedicated to the reinforcement of the lower part of the pedal bracket is provided, a satisfactory level of stiffness is imparted to the lower part of the pedal bracket. Thus, the weight of the vehicle body structure is reduced.

Note that the force of treading the pedal concentrates on the lower part of the pedal bracket. Hence, reinforcing the lower part of the pedal bracket with the center cross portion is suitable as the reinforcement of the pedal bracket.

The above vehicle body structure may further include a side sill extending in a vehicle-body front-back direction along an outer end of the floor panel, a floor frame provided on an inner side with respect to the side sill in the vehicle-body width direction and extending in the vehicle-body front-back direction along the floor panel, and a tunnel side frame provided between the floor frame and the tunnel frame and extending in the vehicle-body front-back direction along the floor panel. Furthermore, a load that is applied to the vehicle body structure in case of an accident with front collision may be transmitted to the side sill, the floor frame, the tunnel side frame, and the tunnel frame.

In such a configuration, the load that is applied to the vehicle body structure in the accident with front collision is dispersed to the four frames and is suitably borne by the four frames. Hence, the vehicle body structure is made stiff enough to bear the load applied thereto in case of an accident with front collision.

In the above vehicle body structure, the side sill may be one of a left side sill and a right side sill, the floor frame may be one of a left floor frame and a right floor frame, the tunnel side frame may be one of a left tunnel side frame and a right tunnel side frame, and the left and right front pillars may each be provided at a front end of a corresponding one of the left and right side sills. Furthermore, the vehicle body structure may include an inclined member extending from each of the front pillars to a corresponding one of the floor frames while inclining toward the inner side in the vehicle-body width direction and toward a vehicle-body rear side, and a lateral member extending from the inclined member to a corresponding one of the tunnel side frames toward the inner side in the vehicle-body width direction.

In such a configuration, the front pillar and the floor frame are connected to each other by the inclined member. Furthermore, the inclined member and the tunnel side frame are connected to each other by the lateral member.

Hence, a load applied to the front pillar obliquely from the front side is borne by the inclined member and the lateral member. Thus, the deformation of the front pillar toward the vehicle cabin is suppressed.

BRIEF DESCRIPTION OF THE DRAWINGS

The advantages of the disclosure will become apparent in the following description taken in conjunction with the following drawings.

DETAILED DESCRIPTION

Figure 1:
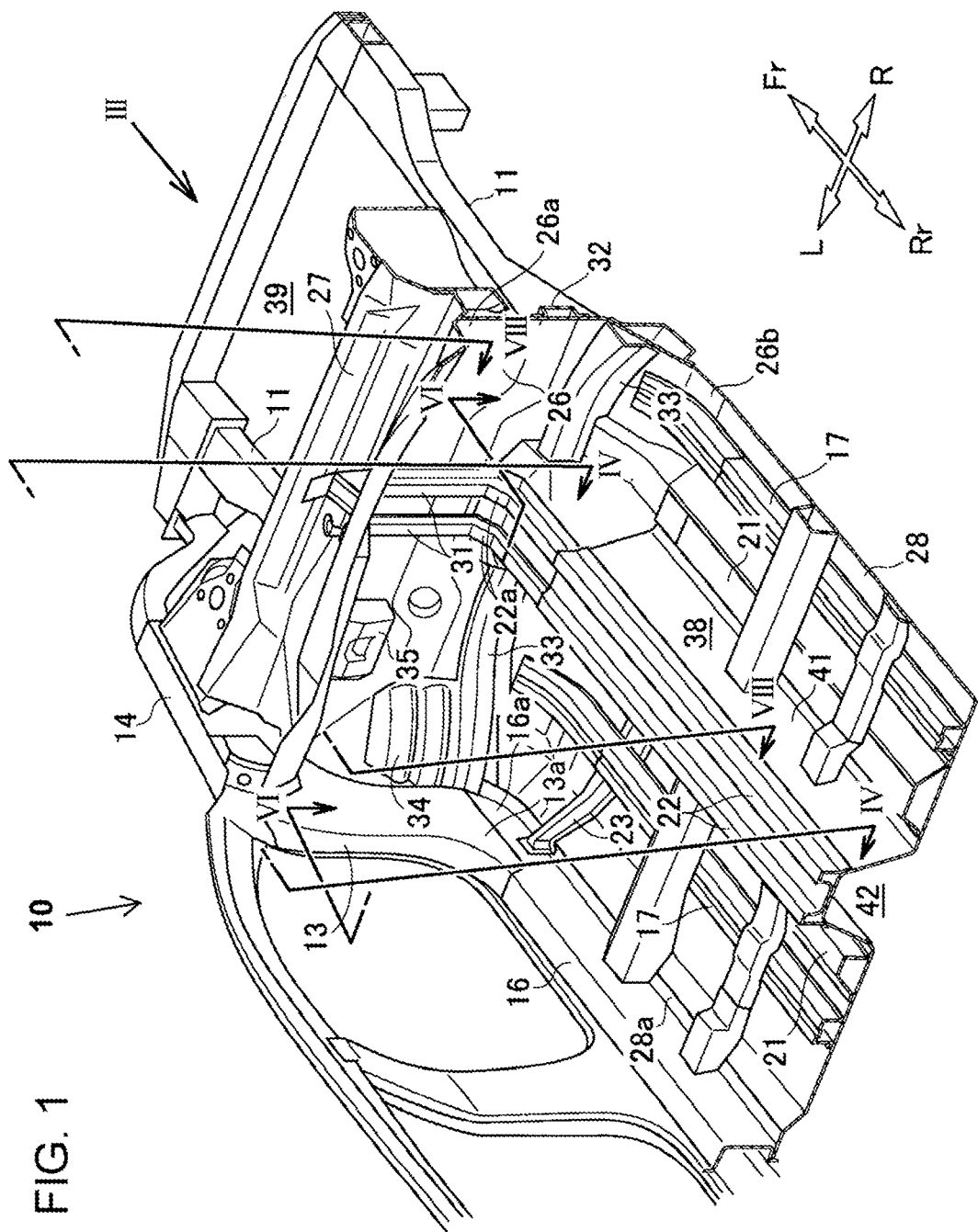
FIG. 1 is a perspective view of a vehicle body structure according to a first embodiment of the present application.

Embodiments of the present application will now be described with reference to the accompanying drawings. The definitions of "front (Fr)," "rear (Rr)," "left (L)," and "right (R)" are based on the view from the driver.

First Embodiment

A vehicle body structure 10 according to a first embodiment will now be described. The vehicle body structure 10 is a substantially symmetrical member. Hereinafter, elements provided on the left side and elements provided on the right side are denoted by common reference numerals, and the elements provided on the left side will be described in detail below. Detailed description of the elements provided on the right side is omitted.

Figure 2:
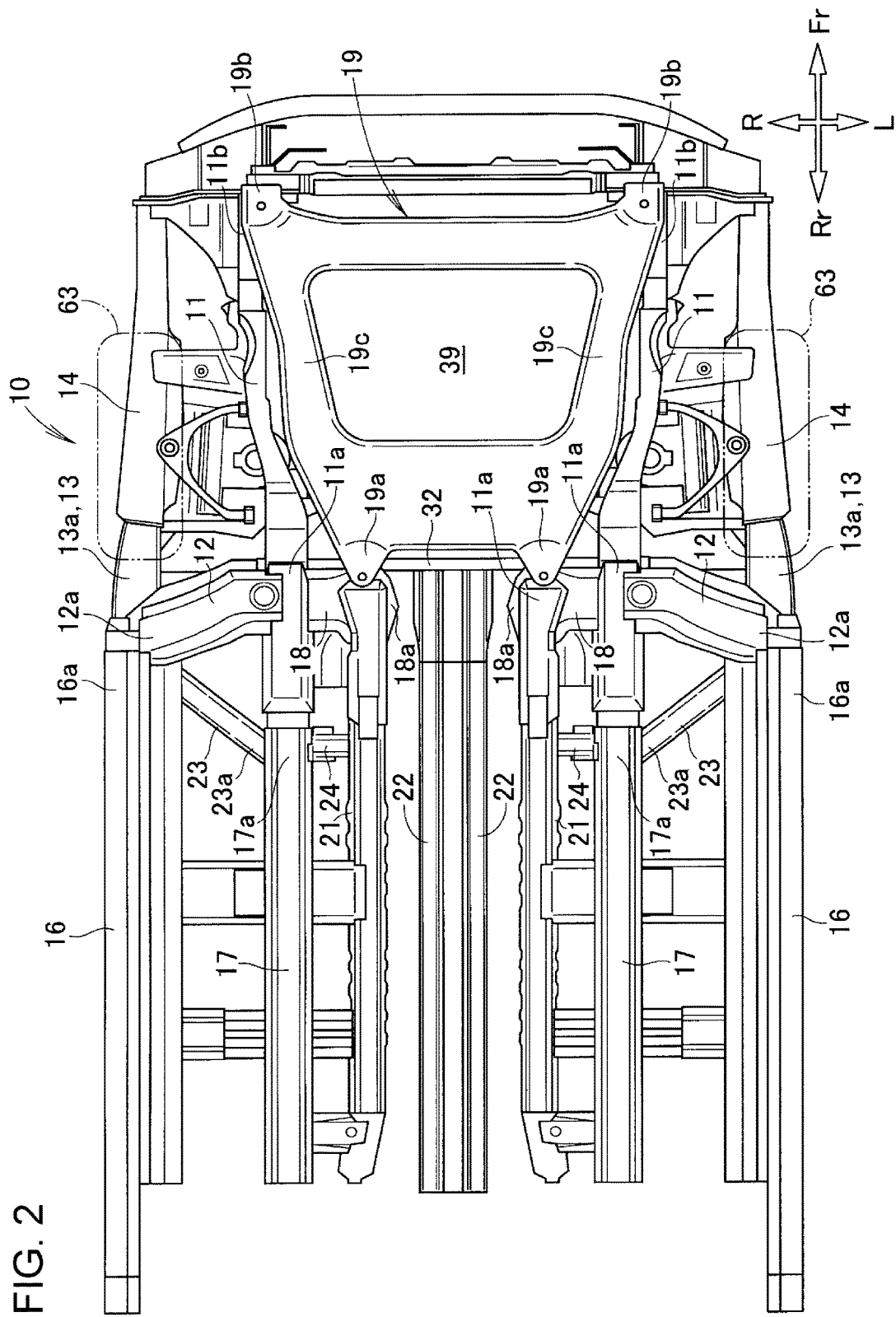
FIG. 2 is a bottom view of the vehicle body structure illustrated in FIG. 1, with a floor panel removed.

Referring to FIGS. 1 and 2, the vehicle body structure 10 includes, on the left side in a vehicle-body width direction, a left front side frame 11, a left outrigger 12 extending from a rear end 11a of the left front side frame 11 toward the outer side in the vehicle-body width direction, a left front pillar 13 extending upward from an outer end 12a of the left outrigger 12, and a left upper member 14 extending from the left front pillar 13 toward the vehicle-body front side.

The vehicle body structure 10 further includes a left side sill 16 extending from the outer end 12a of the left outrigger 12 toward the vehicle-body rear side, a left floor frame 17 extending from the rear end 11a of the left front side frame 11 toward the vehicle-body rear side, a left floor member 18 extending from the rear end 11a of the left front side frame 11 toward the inner side in the vehicle-body width direction, and a subframe 19 connected to an inner end 18a of the left floor member 18 and to an inner end 18a of a right floor member 18.

The vehicle body structure 10 further includes a left tunnel side frame 21 extending from the inner end 18a of the left floor member 18 toward the vehicle-body rear side, a left tunnel frame 22 provided on the inner side with respect to the left tunnel side frame 21 in the vehicle-body width direction, a left inclined member 23 extending from the left front pillar 13 to the left floor frame 17, and a left lateral member 24 extending from the left inclined member 23 to the left tunnel side frame 21.

Figure 3:
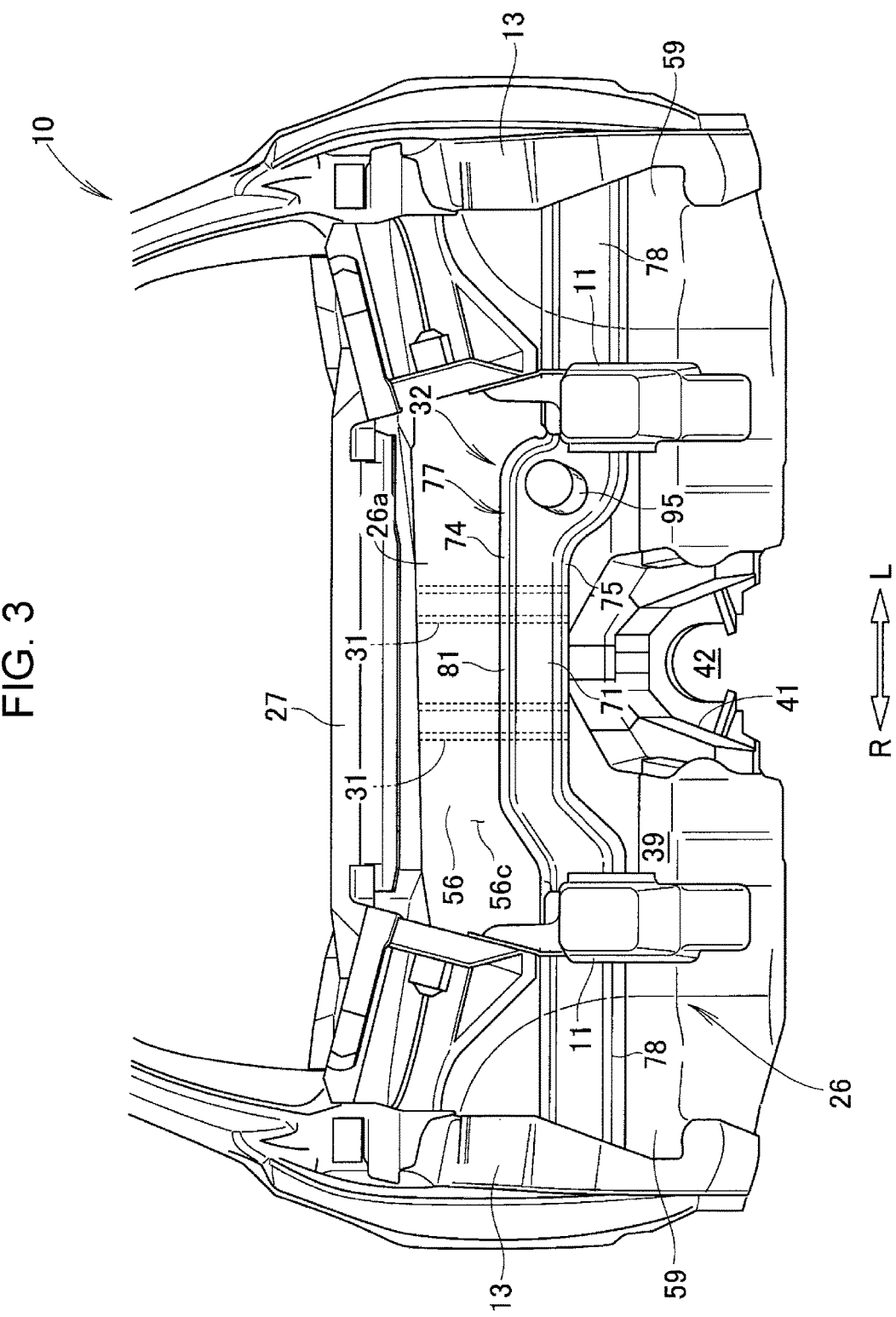
FIG. 3 illustrates the vehicle body structure that is seen in a direction of arrow III illustrated in FIG. 1.

Referring to FIGS. 1 and 3, the vehicle body structure 10 further includes a dash lower panel 26 provided between the left front pillar 13 and a right front pillar 13, a dash upper panel 27 provided at an upper end 26a of the dash lower panel 26, and a floor panel 28 extending from a lower end (specifically, the rear end of a horizontal panel portion 61 (see FIG. 4)) 26b of the dash lower panel 26 toward the vehicle-body rear side.

Figure 10:
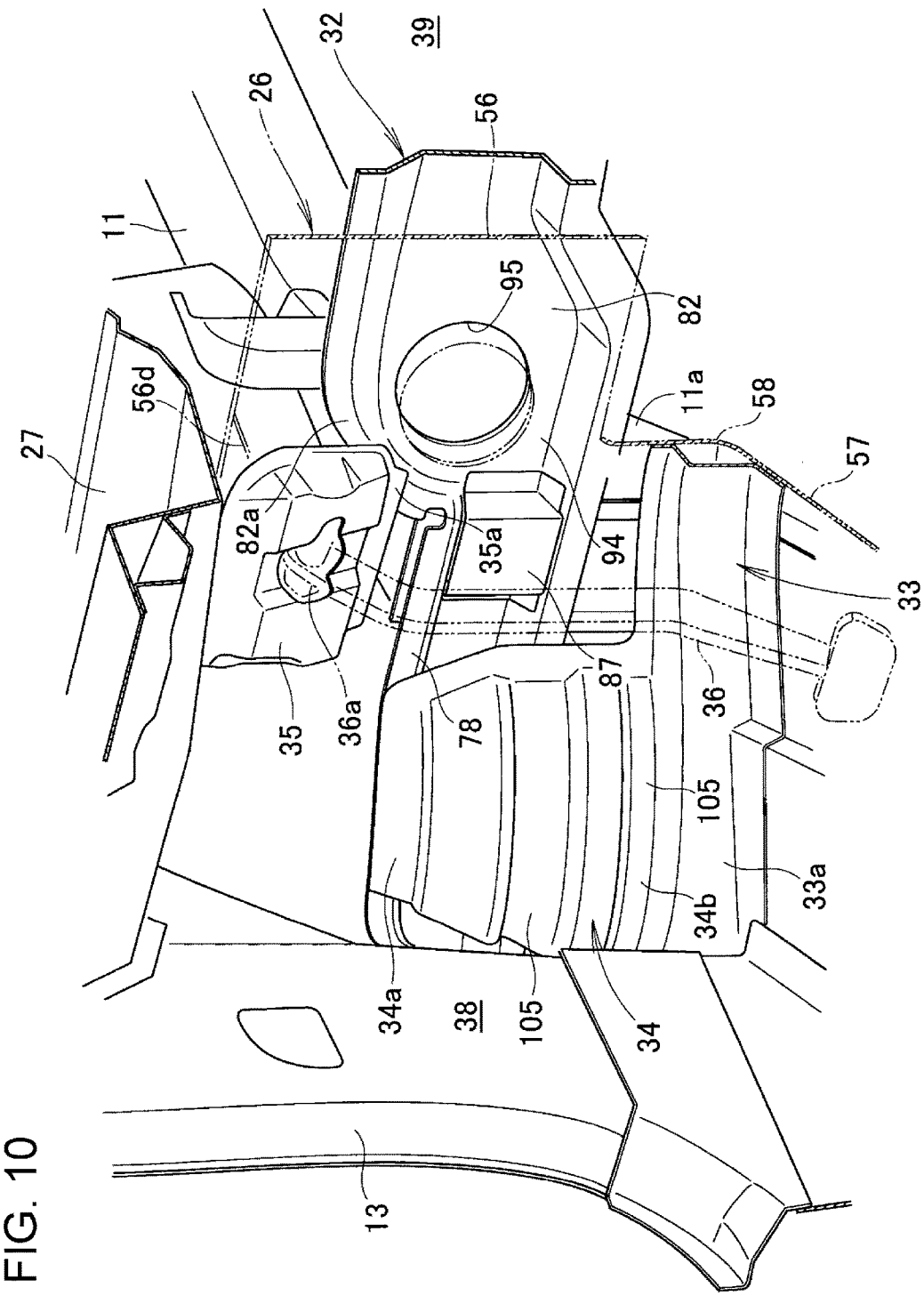
FIG. 10 is a perspective view of a part of the vehicle body structure illustrated in FIG. 1 that is cut at a left reinforcing member.

The vehicle body structure 10 further includes a left dash frame 31 extending vertically along the dash lower panel 26, a dash cross member 32 extending in the vehicle-body width direction and across the left dash frame 31, a left reinforcing member 33 that reinforces the dash lower panel 26, a left tire-load-bearing portion 34 integrated with the left reinforcing member 33, and a pedal bracket 35 that supports a pedal 36 (see FIG. 10).

Referring to FIG. 2, the left front side frame 11 is provided on the left side in the vehicle-body width direction, and the left front side frame 11 and the left floor frame 17 are aligned substantially linearly in a vehicle-body front-back direction. Hence, a load that is applied to the left front side frame 11 in case of an accident with front collision is transmitted to the left floor frame 17.

The left front side frame 11 is provided in an engine room 39 and extends in the vehicle-body front-back direction. The rear end 11a of the left front side frame 11 is connected to the dash cross member 32. The left outrigger 12 connects the rear end 11a of the left front side frame 11 and the front end 16a of the left side sill 16 to each other.

The left front pillar 13 extends upward from the front end 16a of the left side sill 16 (see FIG. 1 also). The left upper member 14 extends from the left front pillar 13 toward the vehicle-body front side.

The left upper member 14, the left front pillar 13, and the left side sill 16 are aligned substantially linearly in the vehicle-body front-back direction. Hence, a load that is applied to the left upper member 14 in case of an accident with front collision is transmitted through the left front pillar 13 to the left side sill 16.

The left side sill 16 extends from a position where a lower end 13a, of the left front pillar 13 and the outer end 12a of the left outrigger 12 meet and toward the vehicle-body rear side. The floor panel 28 (see FIG. 1) is provided between the left side sill 16 and a right side sill 16.

Referring to FIG. 1, the left side sill 16 extends in the vehicle-body front-back direction along a left outer end (outer end) 28a of the floor panel 28. That is, the floor panel 28 is provided on a side of the left side sill 16 that faces a vehicle cabin 38.

The left floor frame 17 is provided on the upper surface of the floor panel 28 and on the inner side with respect to the left side sill 16 in the vehicle-body width direction. The left floor frame 17 extends in the vehicle-body front-back direction along the floor panel 28.

Referring to FIG. 2, the left inclined member 23 connects the left front pillar 13 and the left floor frame 17 to each other. Specifically, the left inclined member 23 extends from the lower end 13a, of the left front pillar 13 to a connecting portion 17a of the left floor frame 17 while inclining toward the inner side in the vehicle-body width direction and toward the vehicle-body rear side.

Referring to FIG. 1, the floor panel 28 includes a floor tunnel 41 at the center thereof in the vehicle-body width direction. The floor tunnel 41 extends in the vehicle-body front-back direction. The floor tunnel 41 has a substantially trapezoidal cross-sectional shape, and an internal space 42 is provided below the floor tunnel 41. A drive shaft, an exhaust pipe, and other components are positioned in the internal space 42.

The left tunnel frame 22 extends along a left ridge of the floor tunnel 41 to the dash lower panel 26. Hence, the left tunnel frame 22 extends substantially linearly in the vehicle-body front-back direction. Therefore, a load that is applied to the vehicle body structure 10 in case of an accident with front collision is transmitted to the left tunnel frame 22 from a front end 22a of the left tunnel frame 22.

A left skirt of the floor tunnel 41 extends between the left floor frame 17 and the left tunnel frame 22. The left tunnel side frame 21 extends in the vehicle-body front-back direction along the left skirt of the floor tunnel 41.

Referring to FIG. 2, a left rear end 19a of the subframe 19 is connected to the inner end 18a of the left floor member 18, and a right rear end 19a of the subframe 19 is connected to the inner end 18a of the right floor member 18. Furthermore, a left front end 19b of the subframe 19 is connected to a front lower portion 11b of the left front side frame 11, and a right front end 19b of the subframe 19 is connected to a front lower portion 11b of the right front side frame 11.

The left tunnel side frame 21 extends from the inner end 18a of the left floor member 18 toward the vehicle-body rear side. Hence, a left side-frame portion 19c of the subframe 19 and the left tunnel side frame 21 are aligned substantially linearly in the vehicle-body front-back direction.

Therefore, a load that is applied to the left side-frame portion 19c of the subframe 19 in case of an accident with front collision is transmitted to the left tunnel side frame 21.

The left tunnel side frame 21 is connected to the connecting portion 17a of the left floor frame 17 by the left lateral member 24. That is, the left lateral member 24 extends inward in the vehicle-body width direction from the connecting portion 17a of the left floor frame 17 to the left tunnel side frame 21.

The connecting portion 17a of the left floor frame 17 is a portion to which an inner end 23a, of the left inclined member 23 is connected. Hence, the left inclined member 23 is connected to the left lateral member 24 at the connecting portion 17a of the left floor frame 17.

Figure 4:
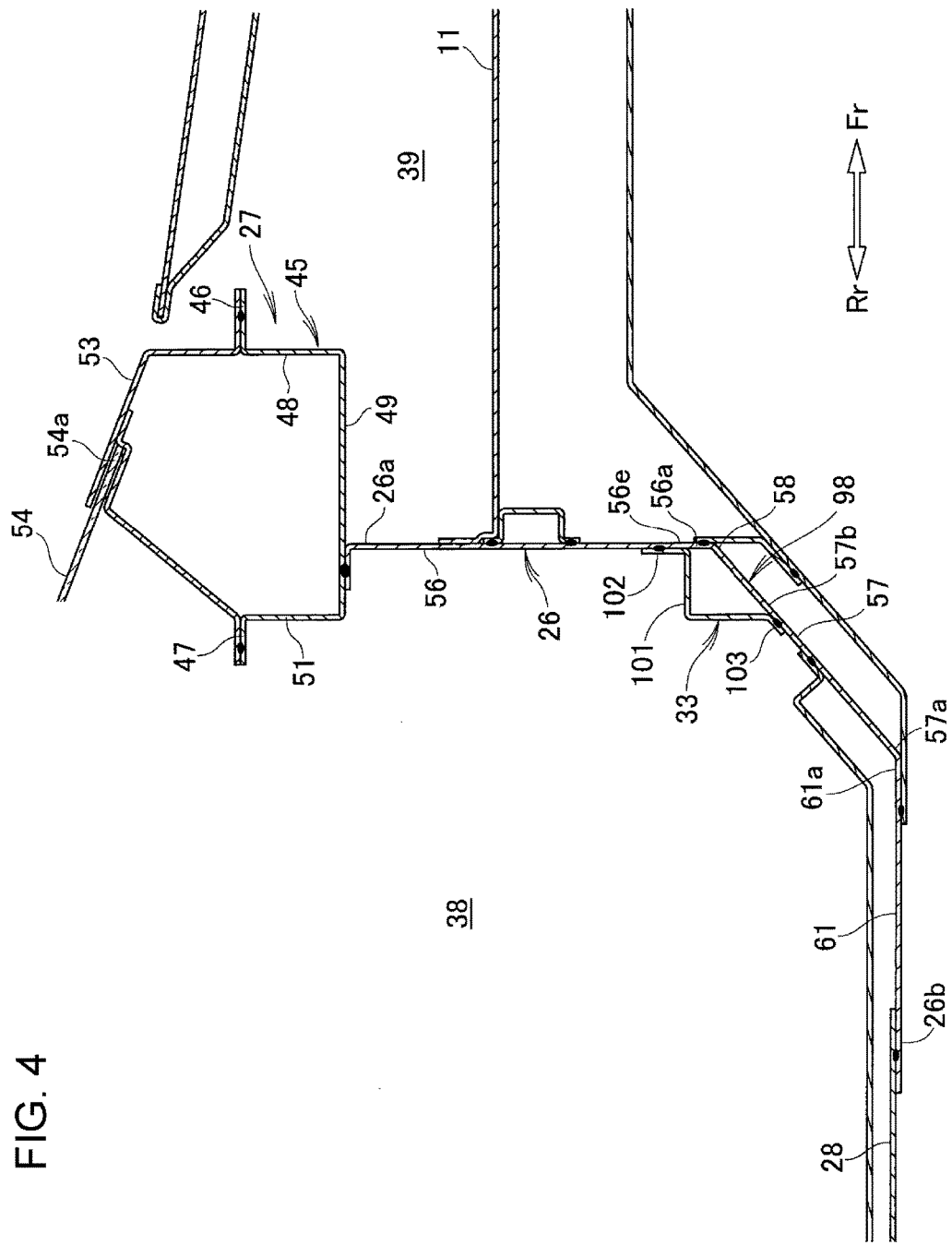
FIG. 4 is a sectional view of the vehicle body structure that is taken along line IV-IV illustrated in FIG. 1 and illustrates a simplified configuration of a dash upper panel.
Figure 5:
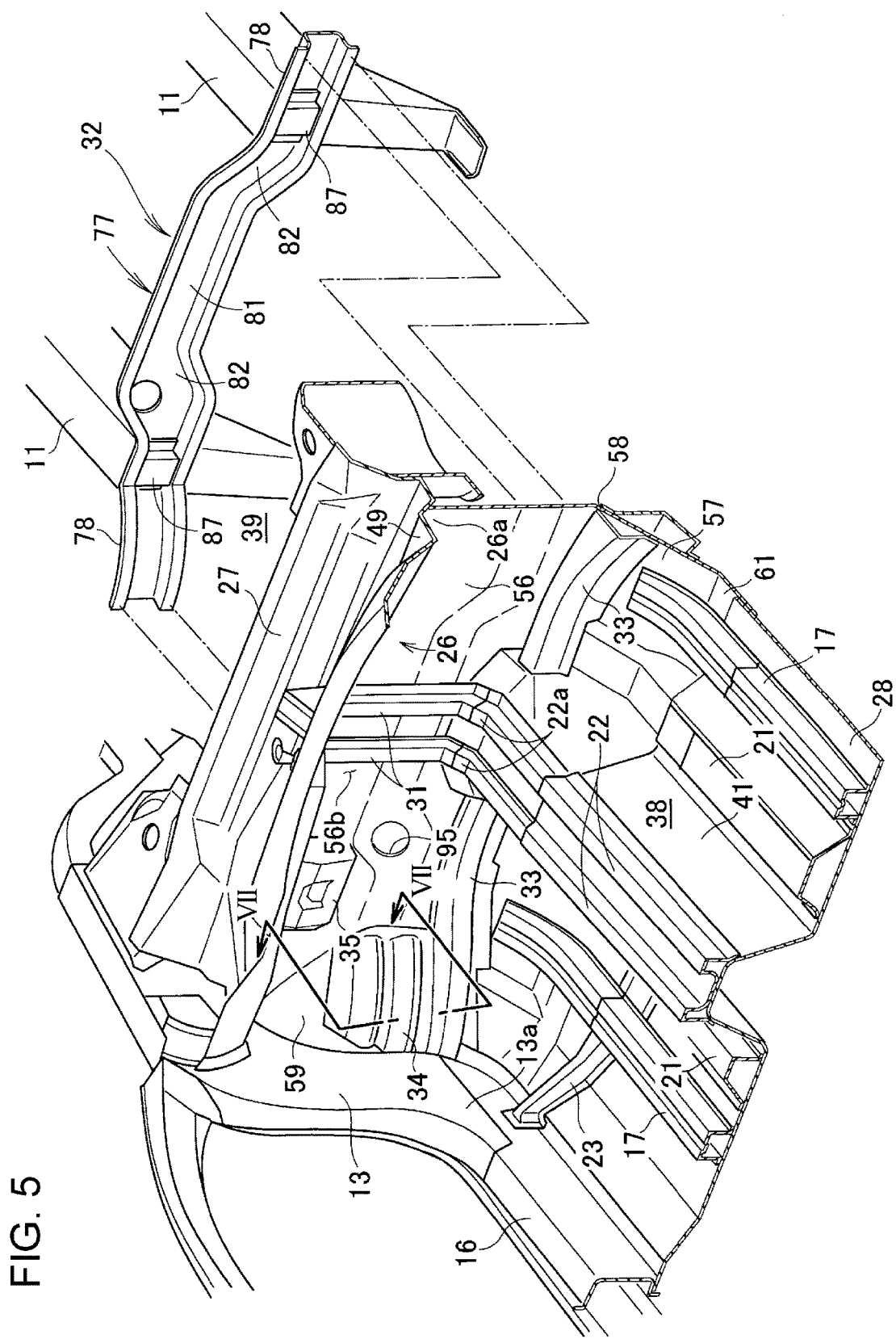
FIG. 5 is an exploded perspective view of the vehicle body structure illustrated in FIG. 1, with a dash cross member detached.

Referring to FIGS. 4 and 5, the dash lower panel 26 is provided between the left front pillar 13 and the right front pillar 13 and separates the vehicle cabin 38 and the engine room 39 from each other in the vehicle-body front-back direction.

The dash upper panel 27 is provided at the upper end 26a of the dash lower panel 26 and between the left front pillar 13 and the right front pillar 13 (see FIG. 3 for the right front pillar 13).

The dash upper panel 27 includes a cross-sectionally U-shaped portion 45 having a U-shape in cross-sectional view and being open on the upper side, a front flange 46 extending from the cross-sectionally U-shaped portion 45 toward the vehicle-body front side, and a rear flange 47 extending from the cross-sectionally U-shaped portion 45 toward the vehicle-body rear side.

The cross-sectionally U-shaped portion 45 includes an upper front wall 48 facing the engine room 39, an upper bottom portion 49 extending from the lower end of the upper front wall 48 toward the vehicle-body rear side, and an upper rear wall 51 extending upward from the rear end of the upper bottom portion 49.

The front flange 46 extends from the upper end of the upper front wall 48 toward the vehicle-body front side. The rear flange 47 extends from the upper end of the upper rear wall 51 toward the vehicle-body rear side. Thus, the dash upper panel 27 that includes the cross-sectionally U-shaped portion 45, the front flange 46, and the rear flange 47 has a substantially hat-like shape that is open on the upper side in cross-sectional view.

The dash upper panel 27 is provided with a cowl top 53a. The cowl top 53 supports a lower end 54a of a windshield 54.

The upper end 26a of the dash lower panel 26 is joined to the upper bottom portion 49 of the dash upper panel 27. The dash lower panel 26 includes a vertical panel portion 56 hanging down from the upper bottom portion 49, an inclined panel portion 57 extending from a lower end 56a of the vertical panel portion 56 while descending toward the vehicle-body rear side, and a bent part 58 defined at a point where the vertical panel portion 56 and the inclined panel portion 57 meet.

The dash lower panel 26 further includes a left wheel arch portion 59 and a right wheel arch portion 59 (see FIG. 3) on the left and right sides thereof, respectively, and the horizontal panel portion 61 extending from a lower end 57a of the inclined panel portion 57 toward the vehicle-body rear side.

The vertical panel portion 56 hangs down from the upper bottom portion 49 to a front end 41a (see FIG. 8) of the floor tunnel 41, thereby extending substantially vertically. The inclined panel portion 57 is a toeboard (a board on which occupants rest their feet) extending from the lower end 56a of the vertical panel portion 56 to a front end 61a of the horizontal panel portion 61 while descending toward the vehicle-body rear side.

The bent part 58 is defined at the point where the inclined panel portion 57 and the vertical panel portion 56 meet. The bent part 58 forms a ridge projecting toward the engine room 39.

Figure 6:
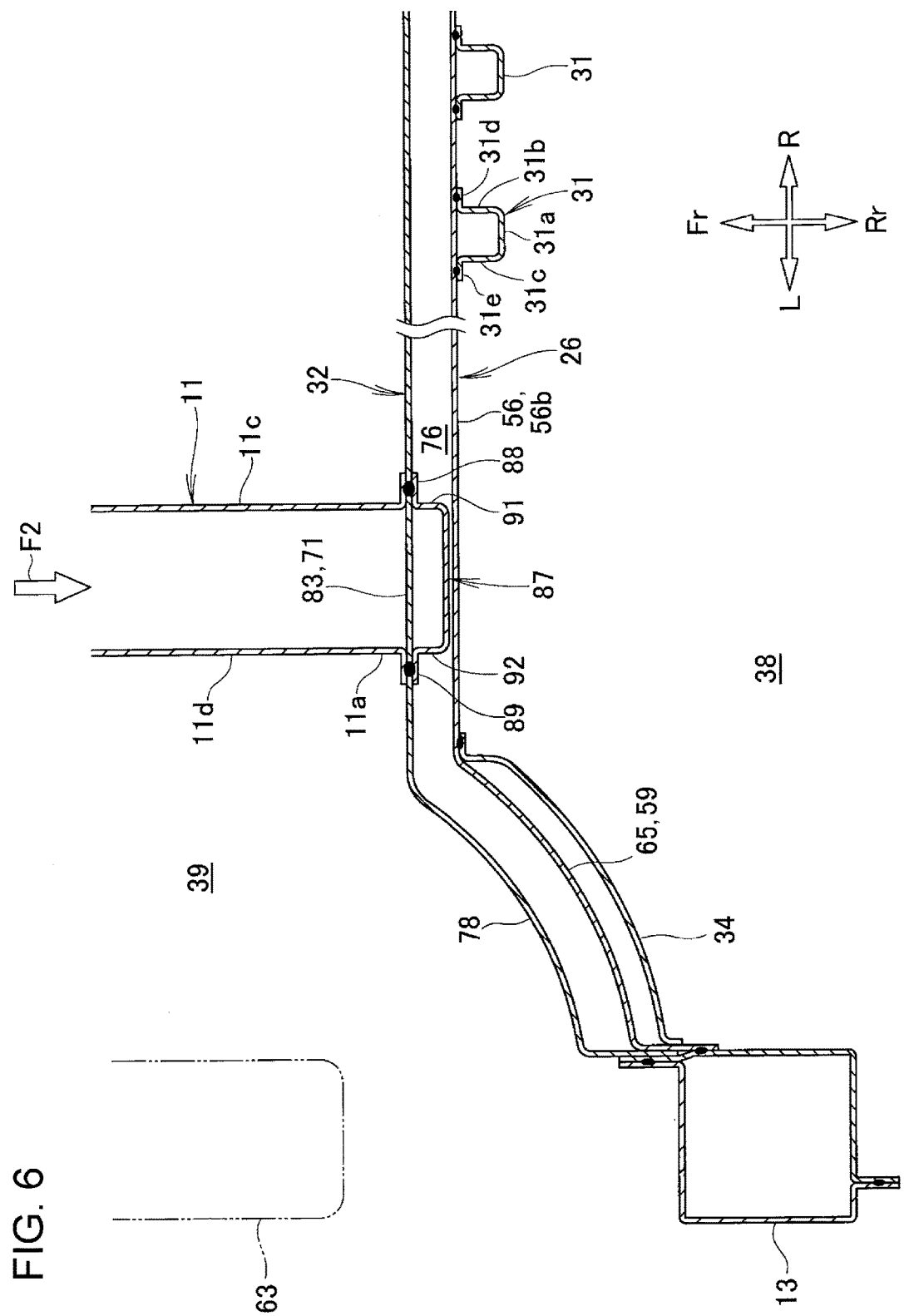
FIG. 6 is a sectional view of the vehicle body structure that is taken along line VI-VI illustrated in FIG. 1.

Referring to FIG. 6, the dash lower panel 26 includes the left wheel arch portion 59 on the left side thereof, and the left wheel arch portion 59 is positioned on the vehicle-body rear side with respect to a left front wheel (wheel) 63a. The left wheel arch portion 59 has a curved shape that bulges toward the vehicle cabin 38, thereby being concave on a side thereof that faces the left front wheel 63a.

Hence, the left front wheel 63 is prevented from interfering with the left wheel arch portion 59 at the turning of the left front wheel 63a.

Figure 7:
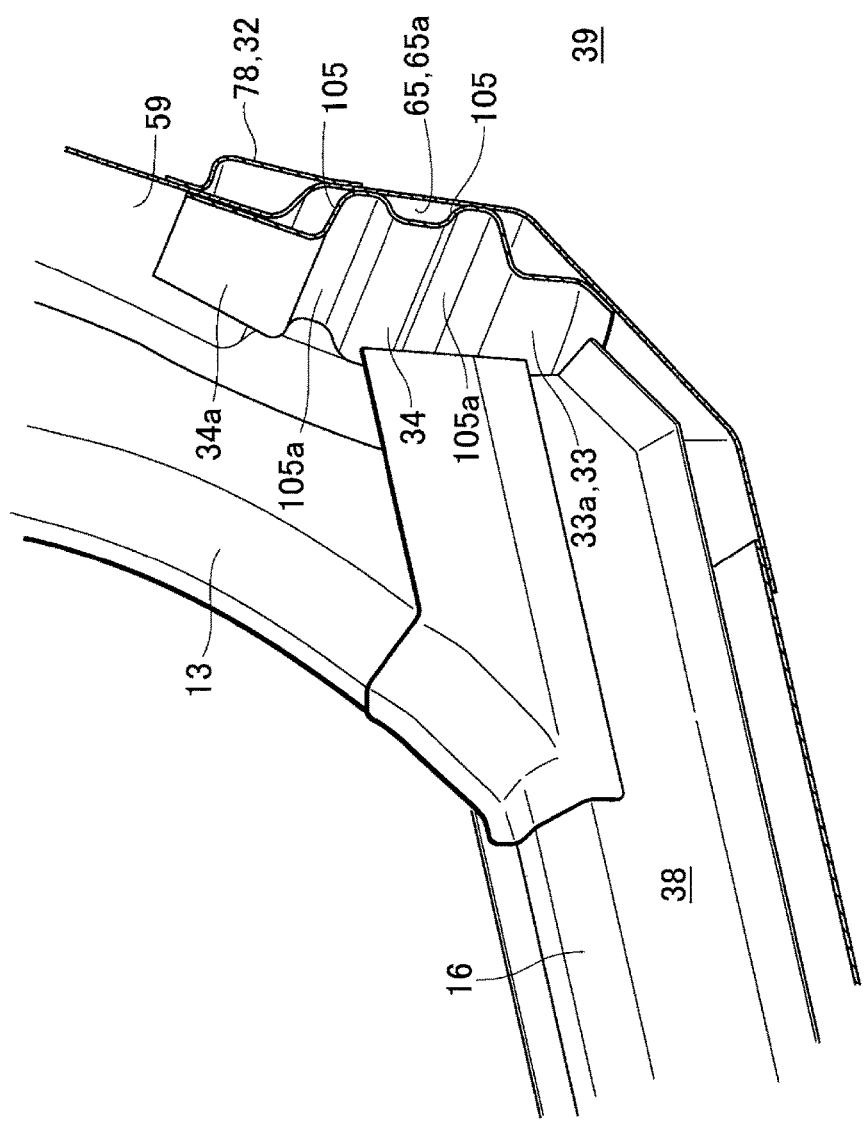
FIG. 7 is a perspective view of a part of the vehicle body structure illustrated in FIG. 1 that is cut at a left tire-load-bearing portion.

Referring to FIG. 7, the left wheel arch portion 59 includes a concave part 65 that is concave on a side thereof that faces the vehicle cabin 38. The concave part 65 is concave toward the engine room 39. A plurality of beads 105 included in the left tire-load-bearing portion 34 are fitted in the concave part 65.

Since the left tire-load-bearing portion 34 includes the plurality of beads 105, the left tire-load-bearing portion 34 is reinforced by the plurality of beads 105.

Figure 8:
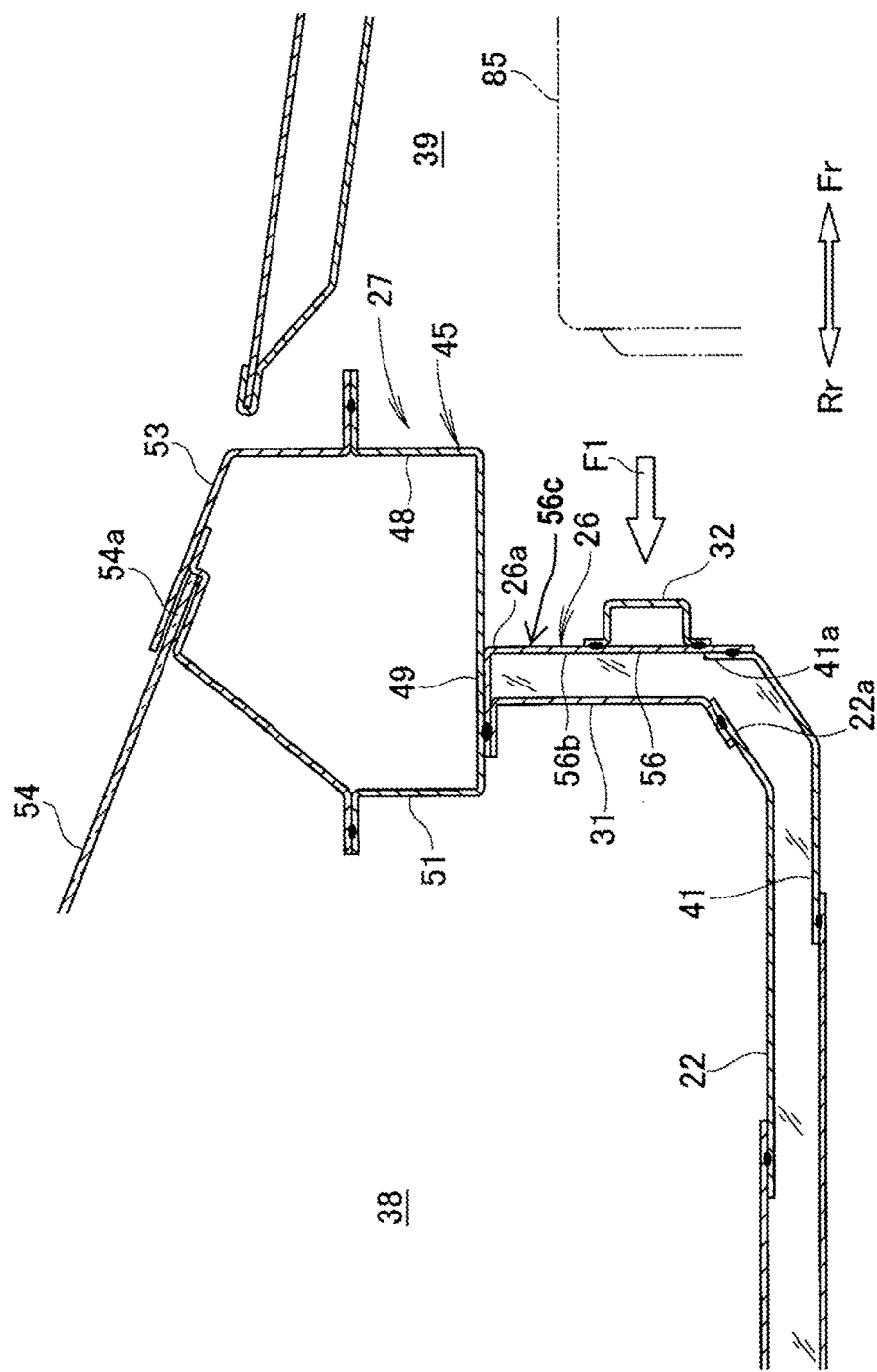
FIG. 8 is a sectional view of the vehicle body structure that is taken along line VIII-VIII illustrated in FIG. 1 and illustrates a simplified configuration of the dash upper panel.

Referring to FIGS. 5 and 8, the left dash frame 31 is joined to a vehicle-cabin-side surface 56b of the vertical panel portion 56 of the dash lower panel 26. The left dash frame 31 extends upward from the front end 22a of the left tunnel frame 22 along the vehicle-cabin-side surface 56b of the vertical panel portion 56 to the upper bottom portion 49 of the dash upper panel 27.

Referring to FIG. 6, the left dash frame 31 includes a rear wall 31a, an inner wall 31b, an outer wall 31c, an inner flange 31d, and an outer flange 31e. The rear wall 31a, the inner wall 31b, and the outer wall 31c together form a substantially rectangular U shape in cross-sectional view.

The left dash frame 31 that includes the rear wall 31a, the inner wall 31b, the outer wall 31c, the inner flange 31d, and the outer flange 31e has a substantially hat-like shape in cross-sectional view. The inner flange 31d and the outer flange 31e are joined to the vehicle-cabin-side surface 56b of the vertical panel portion 56.

In the above state, the left dash frame 31 and the vehicle-cabin-side surface 56b of the vertical panel portion 56 together define a closed space in cross-sectional view, whereby a satisfactory level of stiffness is imparted to the left dash frame 31.

Referring to FIGS. 5 and 8, as with the left dash frame 31, the right dash frame 31 extends upward from a front end 22a of the right tunnel frame 22 along the vehicle-cabin-side surface 56b of the vertical panel portion 56 to the upper bottom portion 49 of the dash upper panel 27.

Furthermore, as with the left dash frame 31, the right dash frame 31 has a satisfactory level of stiffness.

The left dash frame 31 and the right dash frame 31 are arranged on the left and right sides, respectively, at an interval in the vehicle-body width direction and parallel to each other while both extending vertically.

The left dash frame 31 and the left tunnel frame 22 together form a substantially L shape in side view. Likewise, the right dash frame 31 and the right tunnel frame 22 together form a substantially L shape in side view.

In the above state, the left dash frame 31 is firmly supported by the left tunnel frame 22 and the upper bottom portion 49 of the dash upper panel 27. Likewise, the right dash frame 31 is firmly supported by the right tunnel frame 22 and the upper bottom portion 49 of the dash upper panel 27.

The dash cross member 32 extends in the vehicle-body width direction and across the left dash frame 31 and the right dash frame 31 (see FIG. 3 also).

Referring to FIGS. 3 and 8, the dash cross member 32 is provided on an engine-room-side surface 56c of the vertical panel portion 56 of the dash lower panel 26. Specifically, the dash cross member 32 extends in the vehicle-body width direction along the engine-room-side surface 56c of the vertical panel portion 56 of the dash lower panel 26 and bridges the left front pillar 13 and the right front pillar 13. In this state, the dash cross member 32 is joined to the engine-room-side surface 56c of the vertical panel portion 56.

Figure 9:
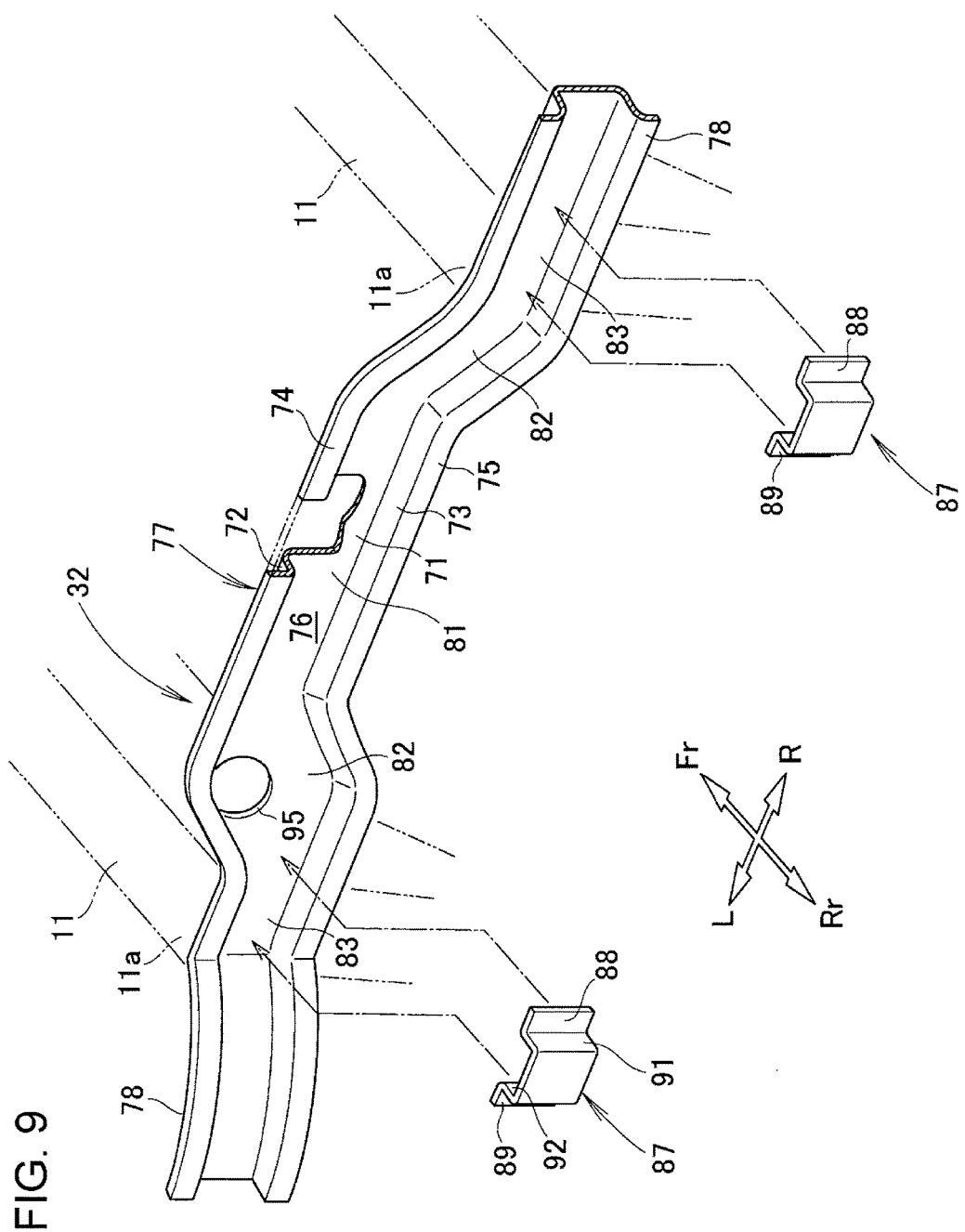
FIG. 9 is an exploded perspective view of the dash cross member illustrated in FIG. 5, with left and right bulkheads detached.

Referring to FIG. 9, the dash cross member 32 includes a front cross wall 71, an upper cross portion 72, a lower cross portion 73, an upper flange 74, and a lower flange 75. The front cross wall 71, the upper cross portion 72, and the lower cross portion 73 together form a substantially U shape in cross-sectional view. The dash cross member 32 that includes the front cross wall 71, the upper cross portion 72, the lower cross portion 73, the upper flange 74, and the lower flange 75 has a substantially hat-like shape in cross-sectional view.

Thus, the dash cross member 32 defines an internal space 76 in cross-sectional view.

The dash cross member 32 also includes a center cross portion 77 joined to the vertical panel portion 56, a left cross portion 78 joined to the left wheel arch portion 59 of the dash lower panel 26, and a right cross portion 78 joined to the right wheel arch portion 59 of the dash lower panel 26.

The center cross portion 77 includes a central part 81 positioned above the floor tunnel 41, a left inclined part 82 extending from the left end of the central part 81 while descending toward the outer side in the vehicle-body width direction, a left frame-connecting part 83 connecting the left inclined part 82 and the left cross portion 78 to each other, a right inclined part 82 extending from the right end of the central part 81 while descending toward the outer side in the vehicle-body width direction, and a right frame-connecting part 83 connecting the right inclined part 82 and the right cross portion 78 to each other.

The central part 81 is at the center of the center cross portion 77 in the vehicle-body width direction and is raised, i.e., offset upward, with respect to the left frame-connecting part 83 and the right frame-connecting part 83a. The central part 81 that is raised in such a manner is positioned above the floor tunnel 41 (see FIG. 5 also).

In the above state, the central part 81 extends across the left dash frame 31 and the right dash frame 31 and overlaps the left dash frame 31 and the right dash frame 31 in the vehicle-body front-back direction with the vertical panel portion 56 interposed therebetween (see FIG. 8 also).

Referring to FIGS. 5 and 8, the left dash frame 31 is firmly supported by the left tunnel frame 22 and the upper bottom portion 49 of the dash upper panel 27. Likewise, the right dash frame 31 is firmly supported by the right tunnel frame 22 and the upper bottom portion 49 of the dash upper panel 27.

Hence, if a power source (for example, an engine) 85 provided in the engine room 39 is moved rearward in an accident with front collision and a load F1 is applied to the dash cross member 32, the load F1 is borne by the left dash frame 31 and the right dash frame 31.

Furthermore, since the left dash frame 31 and the right dash frame 31 each extend up to the upper bottom portion 49 of the dash upper panel 27, the dash upper panel 27 is reinforced by the left and right dash frames 31.

Thus, the stiffness of the dash upper panel 27 is increased, and vibrations of the windshield 54 supported by the dash upper panel 27 are suppressed.

Referring to FIG. 10, the pedal bracket 35 is attached, from the side of the vehicle cabin 38, to an upper left part 56d of the vertical panel portion 56 of the dash lower panel 26. An upper end 36a of the pedal 36 is supported by the pedal bracket 35 in such a manner as to be turnable in the vehicle-body front-back direction.

An upper part 82a of the left inclined part 82 overlaps an inner lower part (lower part) 35a of the pedal bracket 35 in the vehicle-body front-back direction with the vertical panel portion 56 interposed therebetween. Thus, the inner lower part 35a of the pedal bracket 35 is reinforced by the left inclined part 82.

Hence, even if no member that is dedicated to the reinforcement of the inner lower part 35a of the pedal bracket 35 is provided, a satisfactory level of stiffness is imparted to the inner lower part 35a of the pedal bracket 35. Thus, the weight of the vehicle body structure 10 is reduced.

It is known that the force of treading the pedal 36 concentrates on a lower part of the pedal bracket 35. Hence, reinforcing the inner lower part 35a of the pedal bracket 35 by the upper part 82a of the left inclined part 82 is suitable as the reinforcement of the pedal bracket 35.

Referring to FIGS. 6 and 9, a left bulkhead (bulkhead) 87 is provided in a portion of the internal space 76, which is defined by the dash cross member 32, at the left frame-connecting part 83a. Specifically, an inner flange 88 and an outer flange 89 of the left bulkhead 87 are joined to the front cross wall 71 at the left frame-connecting part 83a.

Furthermore, the rear end 11a of the left front side frame 11 is joined (connected) to the inner flange 88 and the outer flange 89 in such a manner as to overlap the inner flange 88 and the outer flange 89 in the vehicle-body front-back direction with the front cross wall 71 interposed therebetween.

In the above state, an inner wall 91 of the left bulkhead 87 aligns with an inner wall 11c of the left front side frame 11 in the vehicle-body front-back direction, and an outer wall 92 of the left bulkhead 87 aligns with an outer wall 11d of the left front side frame 11 in the vehicle-body front-back direction.

Hence, a load F2 that is applied to the left front side frame 11 in case of an accident with front collision is transmitted to the inner wall 91 and the outer wall 92 of the left bulkhead 87. The inner wall 91 and the outer wall 92 of the left bulkhead 87 are bulkhead functional portions capable of bearing the load F2. Thus, the load F2 that is applied to the left front side frame 11 in case of an accident with front collision is borne by the left bulkhead 87.

Furthermore, the left bulkhead 87 is provided in the portion of the internal space 76 at the left frame-connecting part 83a. Hence, the left bulkhead 87 suppresses the squashing of the dash cross member 32 in the cross-sectional direction.

Furthermore, since the left bulkhead 87 is connected to the left front side frame 11 as illustrated in FIG. 6, the strength at the connection between the dash cross member 32 and the rear end 11a of the left front side frame 11 is increased.

Hence, a satisfactory level of stiffness is imparted to a portion around a connection 94 (see FIG. 10) between the dash cross member 32 and the left front side frame 11. Therefore, while a through hole 95 that receives a steering shaft 96 (see FIG. 11) is provided near the connection 94, the connection 94 has a satisfactory level of stiffness.

Referring to FIG. 4, the bent part 58 is defined at the point of the dash lower panel 26 where the vertical panel portion 56 and the inclined panel portion 57 meet. The bent part 58 is covered by the left reinforcing member 33 from the side of the vehicle cabin 38.

The left reinforcing member 33 includes a member portion 101 having a substantially V shape projecting toward the vehicle cabin 38, an upper flange 102 provided at the upper end of the member portion 101, and a lower flange 103 provided at the lower end of the member portion 101.

The upper flange 102 is joined to a lower part 56e of the vertical panel portion 56 from the side of the vehicle cabin 38. The lower flange 103 is joined to an upper part 57b of the inclined panel portion 57 from the side of the vehicle cabin 38. Thus, the lower part 56e of the vertical panel portion 56, the upper part 57b of the inclined panel portion 57, and the member portion 101 together define a closed space 98 having a substantially quadrilateral cross-sectional shape.

Hence, the presence of the closed space 98 reinforces the inclined panel portion 57, and the stiffness of the inclined panel portion 57 is increased. Since the stiffness of the inclined panel portion 57 is increased, the deformation of the inclined panel portion 57, which is at the feet of the occupants, is suppressed.

Figure 11:
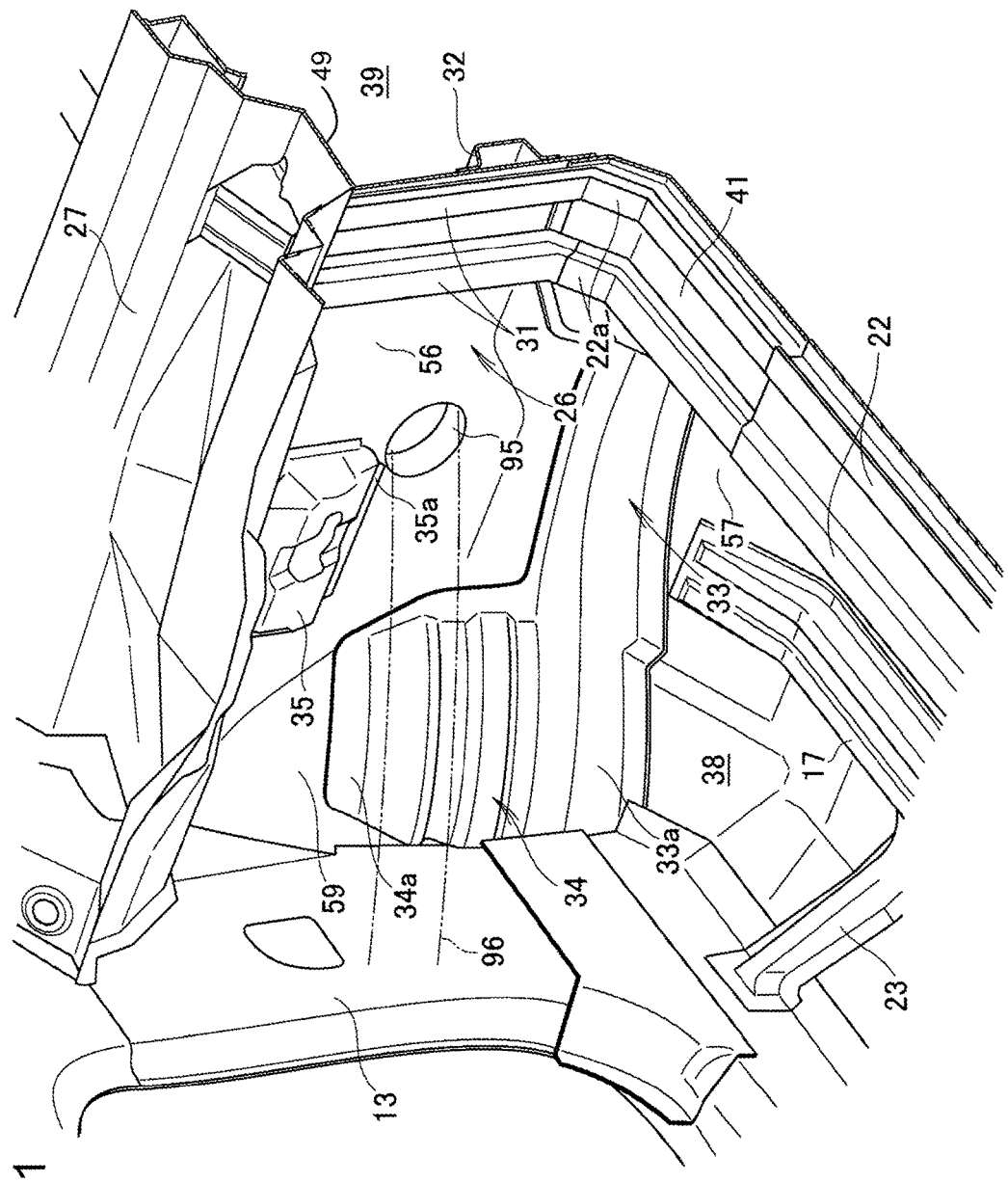
FIG. 11 is a perspective view of a part of the vehicle body structure illustrated in FIG. 1 that is cut at a floor tunnel.

Referring to FIGS. 7, 10 and 11, a left end 33a of the left reinforcing member 33 is joined to the left wheel arch portion 59 from the side of the vehicle cabin 38, and the left tire-load-bearing portion 34 is provided integrally with the left end 33a of the left reinforcing member 33. The left tire-load-bearing portion 34 extends upward from the left end 33a of the left reinforcing member 33 along the left wheel arch portion 59 and bulges toward the vehicle cabin 38.

Referring to FIG. 10, an upper part 34a of the left tire-load-bearing portion 34 overlaps the left cross portion 78 of the dash cross member 32 in the vehicle-body front-back direction with the left wheel arch portion 59 (see FIG. 11) interposed therebetween and is joined to the left wheel arch portion 59 and the left cross portion 78.

Furthermore, since the left tire-load-bearing portion 34 is integrated with and extends upward from the left end 33a, of the left reinforcing member 33, a lower end 34b of the left tire-load-bearing portion 34 is reinforced by the left end 33a, of the left reinforcing member 33a.

The left tire-load-bearing portion 34 includes the plurality of beads 105 (see FIG. 7) each bulging toward the engine room 39.

Referring to FIG. 11, since the left tire-load-bearing portion 34 is joined to the left wheel arch portion 59, the left wheel arch portion 59 is reinforced by the left tire-loadbearing portion 34. Furthermore, since the left tire-load-bearing portion 34 is integrated with the left reinforcing member 33, the left tire-load-bearing portion 34 and the left reinforcing member 33 do not need to be prepared separately, leading to a reduction in the number of components.

Furthermore, since the left tire-load-bearing portion 34 and the left reinforcing member 33 are integrated with each other, the left wheel arch portion 59 is covered by a wide member formed of the left tire-load-bearing portion 34 and the left reinforcing member 33a. Hence, if the left front wheel 63 (see FIG. 6) is moved rearward in an accident with oblique collision and interferes with the left wheel arch portion 59, the load applied to the left wheel arch portion 59 from the left front wheel 63 is received by the left tire-load-bearing portion 34 and the left reinforcing member 33 and is therefore dispersed over a wide area.

Thus, the deformation of the left wheel arch portion 59 toward the vehicle cabin 38 is suppressed by the left tire-load-bearing portion 34 and the left reinforcing member 33a.

Referring to FIG. 10, the left tire-load-bearing portion 34 overlaps the left cross portion 78 of the dash cross member 32 with the left wheel arch portion 59 (see FIG. 11) interposed therebetween. Therefore, a load that is applied to the left cross portion 78 of the dash cross member 32 from the side of the engine room 39 is transmitted to the left tire-load-bearing portion 34 via the left wheel arch portion 59.

Thus, the load applied to the left cross portion 78 of the dash cross member 32 from the side of the engine room 39 is suitably borne by the left tire-load-bearing portion 34.

Furthermore, referring to FIG. 7, the left tire-load-bearing portion 34 includes the plurality of beads 105. The plurality of beads 105 are positioned in such a manner as to face the concave part 65 of the left wheel arch portion 59. The plurality of beads 105 are arranged at intervals in the vertical direction and each extend in the vehicle-body width direction. The plurality of beads 105 each bulge toward the engine room 39 and are fitted in the concave part 65 of the left wheel arch portion 59. In such a state, peaks 105a of the respective beads 105 are joined to a bottom 65a of the concave part 65.

Thus, the left tire-load-bearing portion 34 is reinforced by the plurality of beads 105, and the stiffness of the left tire-load-bearing portion 34 is increased.

Furthermore, since the plurality of beads 105 are fitted in the concave part 65 of the left wheel arch portion 59, the amount of projection of the plurality of beads 105 (i.e., the left tire-load-bearing portion 34) toward the vehicle cabin 38 is suppressed. Thus, a space at the feet of the occupants and a space for attaching an instrument panel and other associated components are provided satisfactorily.

Now, an exemplary case where a load F3 applied to the dash cross member 32 of the vehicle body structure 10 is borne by the left dash frame 31 and the right dash frame 31 will be described with reference to FIG. 12.

Figure 12:
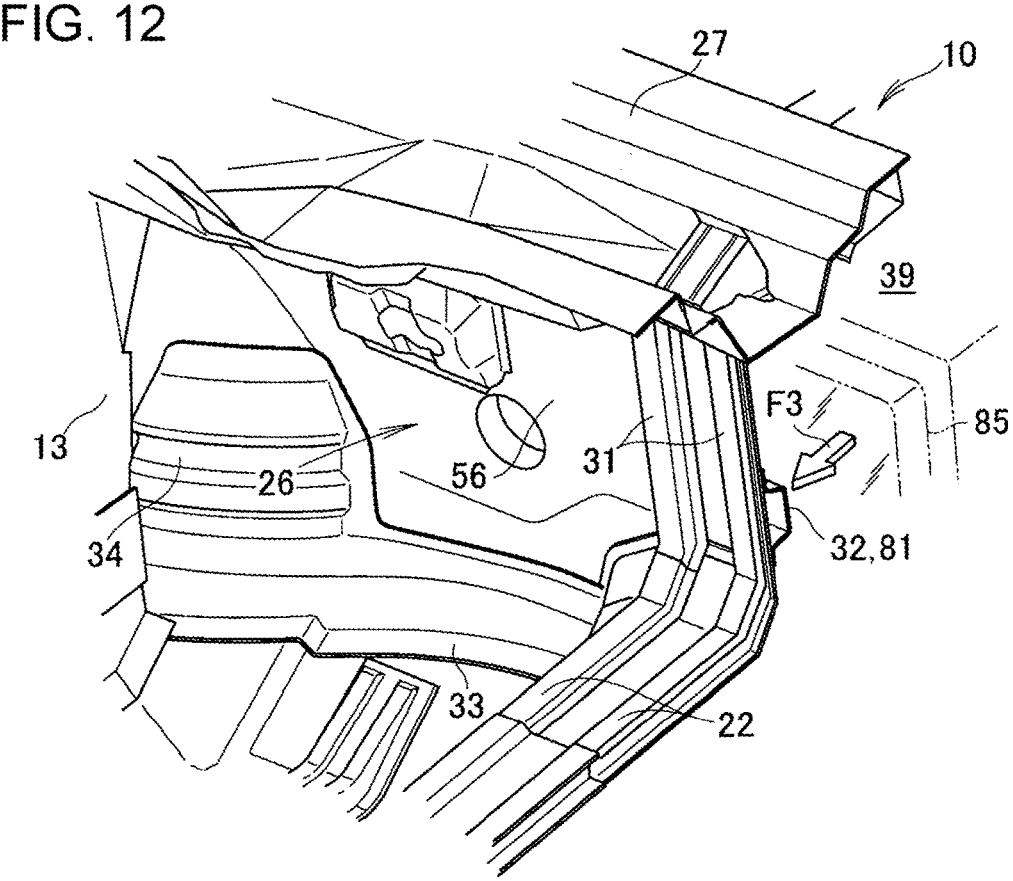
FIG. 12 is a diagram for explaining an exemplary case of how a load applied to the dash cross member of the vehicle body structure according to the first embodiment is borne.

As illustrated in FIG. 12, if the power source (for example, an engine) 85 in the engine room 39 is moved rearward in an accident with front collision, the power source 85 bumps against the dash cross member 32. At the bumping of the power source 85 against the dash cross member 32, a load F3 is applied to the dash cross member 32.

The dash cross member 32, which extends in the vehicle-body width direction, includes the central part 81 that extends across the left dash frame 31 and the right dash frame 31.

Hence, the load F3 applied to the dash cross member 32 is transmitted from the central part 81 to the left dash frame 31 and the right dash frame 31. The left dash frame 31 is firmly supported by the left tunnel frame 22 and the dash upper panel 27. Likewise, the right dash frame 31 is firmly supported by the right tunnel frame 22 and the dash upper panel 27.

Therefore, the load F3 transmitted to the left dash frame 31 and the right dash frame 31 is borne by the two dash frames 31, and the deformation of the dash lower panel 26 (in particular, the vertical panel portion 56) toward the vehicle cabin 38 is suppressed.

Since the deformation of the dash lower panel 26 is suppressed with such a simple structure in which the dash cross member 32 extends across the left dash frame 31 and the right dash frame 31, the weight of the vehicle body structure 10 is reduced.

Now, an exemplary case where a load F4 applied to the left front side frame 11 of the vehicle body structure 10 is borne by the left bulkhead 87 provided on the dash cross member 32 will be described with reference to FIG. 13a.

Figure 13:
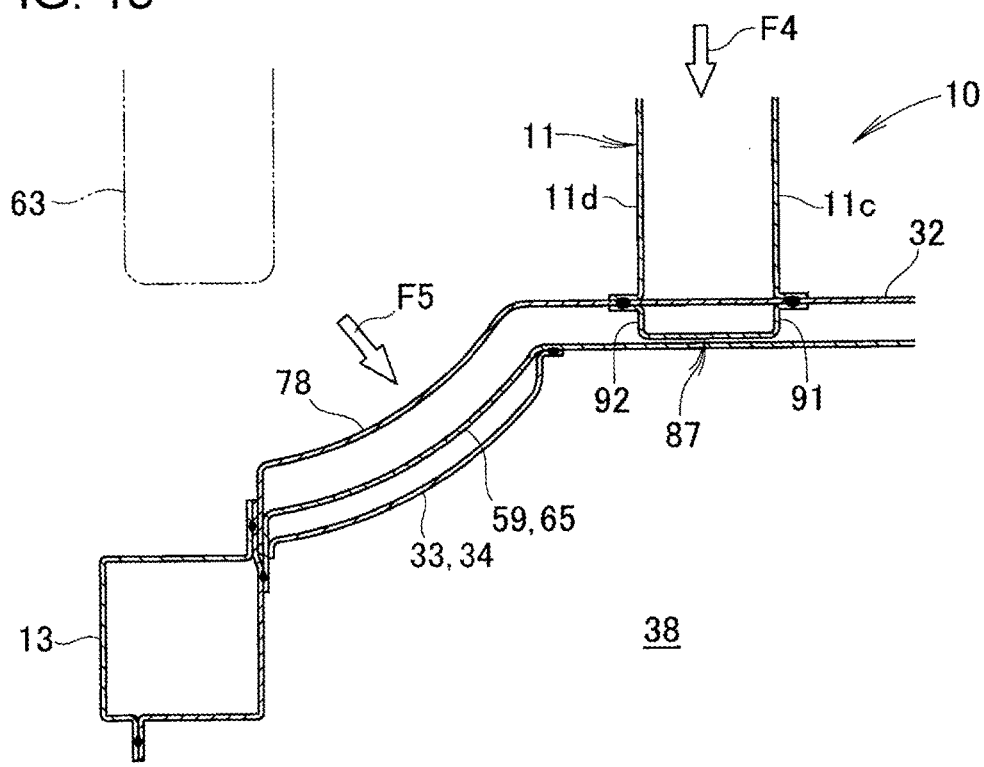
FIG. 13 is a diagram for explaining an exemplary case of how a load applied to a left front side frame of the vehicle body structure according to the first embodiment is borne.

As illustrated in FIG. 13, the inner wall 91 of the left bulkhead 87 is connected to the inner wall 11c of the left front side frame 11. Furthermore, the outer wall 92 of the left bulkhead 87 is connected to the outer wall 11d of the left front side frame 11.

In such a state, a load F4 is applied to the left front side frame 11 in case of an accident with front collision. The load F4 is transmitted through the left front side frame 11 to the left bulkhead 87. That is, the load F4 applied to the left front side frame 11 is borne by the left bulkhead 87.

Note that the inner wall 91 and the outer wall 92 of the left bulkhead 87 are connected to the inner wall 11c and the outer wall 11d, respectively, of the left front side frame 11. Hence, the load F4 applied to the left front side frame 11 is transmitted to the inner wall 91 and the outer wall 92 of the left bulkhead 87.

Thus, the load F4 applied to the left front side frame 11 is suitably borne by the inner wall 91 and the outer wall 92 of the left bulkhead 87.

Now, an exemplary case where a load F5 applied from the left front wheel 63 to the left cross portion 78 of the dash cross member 32 of the vehicle body structure 10 is borne by the left reinforcing member 33 will be described with reference to FIG. 13a.

As illustrated in FIG. 13, the left tire-load-bearing portion 34 and the left reinforcing member 33 that together form a member having a wide area cover the left wheel arch portion 59 (see FIG. 12). In such a state, if the left front wheel 63 is moved rearward in an accident with oblique collision, the left front wheel 63 bumps against the left cross portion 78 and the left wheel arch portion 59.

Accordingly, a load F5 is applied from the left front wheel 63 to the left cross portion 78 and the left wheel arch portion 59. The load F5 is received by the left tire-load-bearing portion 34 and the left reinforcing member 33 and is therefore dispersed over a wide area.

Thus, the deformation of the left cross portion 78 and the left wheel arch portion 59 toward the vehicle cabin 38 is suppressed by the left tire-load-bearing portion 34 and the left reinforcing member 33a.

Now, an exemplary case where a load F6 applied to a front part 10a of the vehicle body structure 10 in an accident with front collision is borne by four frames (the left floor frame 17, the left side sill 16, the left tunnel side frame 21, and the left tunnel frame 22) will be described with reference to FIGS. 14A and 14B.

Figure 14A:
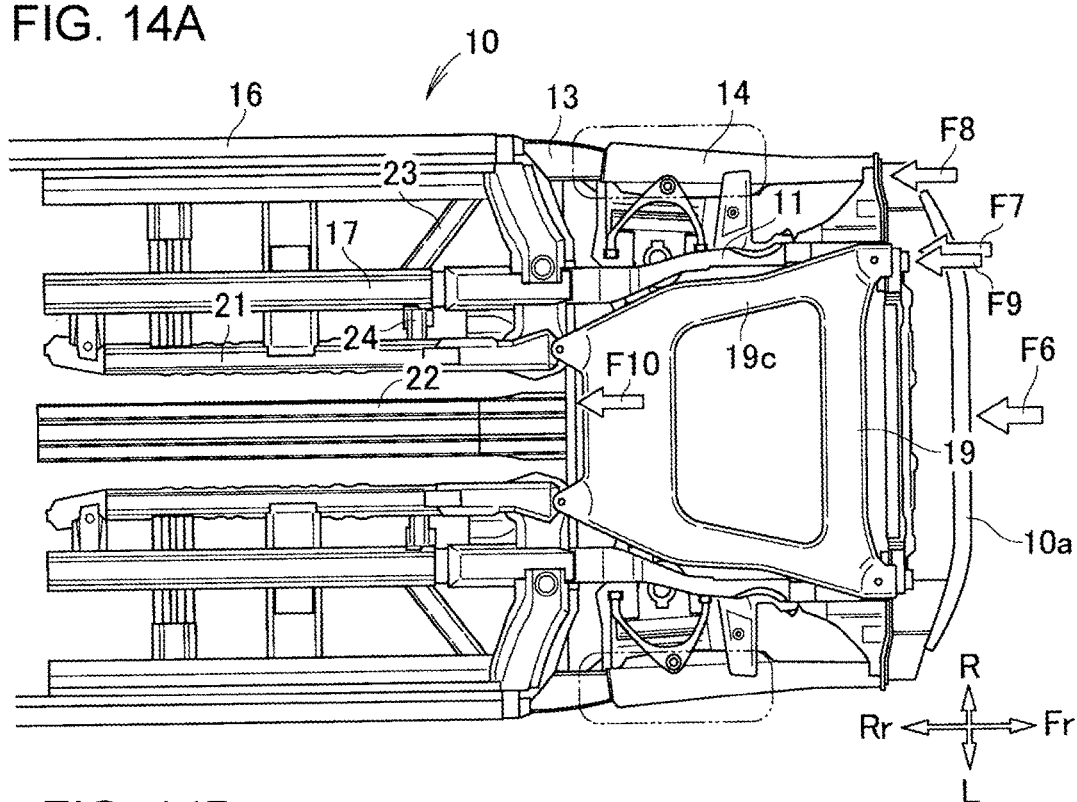
FIGS. 14A and 14B are diagrams for explaining an exemplary case of how a load applied to a front part of the vehicle body structure according to the first embodiment in an accident with front collision is borne by four frames.

As illustrated in FIG. 14A, in case of an accident with front collision, a load F6 is applied to the front part 10a of the vehicle body structure 10.

Note that the left front side frame 11 and the left floor frame 17 are aligned substantially linearly in the vehicle-body front-back direction. Hence, a component force F7 of the load F6 applied to the front part 10a of the vehicle body structure 10 in the accident with front collision is transmitted through the left front side frame 11 to the left floor frame 17.

Furthermore, the left upper member 14, the left front pillar 13, and the left side sill 16 are aligned substantially linearly in the vehicle-body front-back direction. Therefore, a component force F8 of the load F6 applied to the front part 10a of the vehicle body structure 10 in the accident with front collision is transmitted through the left upper member 14 and the left front pillar 13 to the left side sill 16.

Furthermore, the left side-frame portion 19c of the subframe 19 and the left tunnel side frame 21 are aligned substantially linearly in the vehicle-body front-back direction. Hence, a component force F9 of the load F6 applied to the front part 10a of the vehicle body structure 10 in the accident with front collision is transmitted through the left side-frame portion 19c to the left tunnel side frame 21.

Figure 14B:
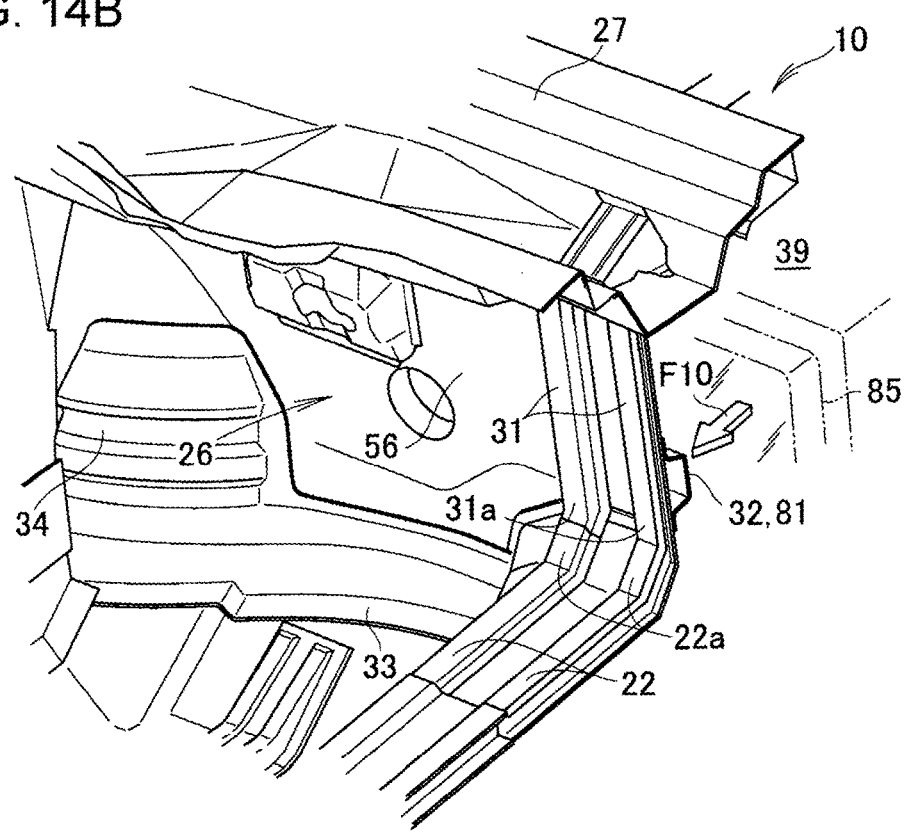

Referring to FIG. 14B, the left tunnel frame 22 extends substantially linearly in the vehicle-body front-back direction. Furthermore, the lower end of the left dash frame 31 is connected to the front end 22a of the left tunnel frame 22. Furthermore, the dash cross member 32 extends across the left dash frame 31.

In such a state, the load F6 applied to the front part 10a (see FIG. 14A) of the vehicle body structure 10 in the accident with front collision moves the power source 85 rearward, and the power source 85 bumps against the dash cross member 32. At the bumping of the power source 85 against the dash cross member 32, a component force F10 is applied to the dash cross member 32. The component force F10 applied to the dash cross member 32 is transmitted through the left dash frame 31 to the front end 22a of the left tunnel frame 22.

As illustrated in FIG. 14A, the left tunnel frame 22 extends substantially linearly in the vehicle-body front-back direction. Therefore, the component force F10 transmitted to the front end 22a of the left tunnel frame 22 is transmitted to the left tunnel frame 22.

Thus, the load F6 applied to the front part 10a of the vehicle body structure 10 in the accident with front collision is dispersed to the four frames (specifically, the left floor frame 17, the left side sill 16, the left tunnel side frame 21, and the left tunnel frame 22).

Therefore, the load F6 applied to the front part 10a of the vehicle body structure 10 in the accident with front collision is suitably borne by the four frames 17, 16, 21, and 22. Hence, the vehicle body structure 10 is made stiff enough to bear the load F6 applied thereto in case of an accident with front collision. Thus, the weight of the vehicle body structure 10 is reduced.

Now, an exemplary case where a load F11 applied obliquely from the front side to the left front pillar 13 of the vehicle body structure 10 is borne by the left inclined member 23 and the left lateral member 24 will be described with reference to FIG. 15.

Figure 15:
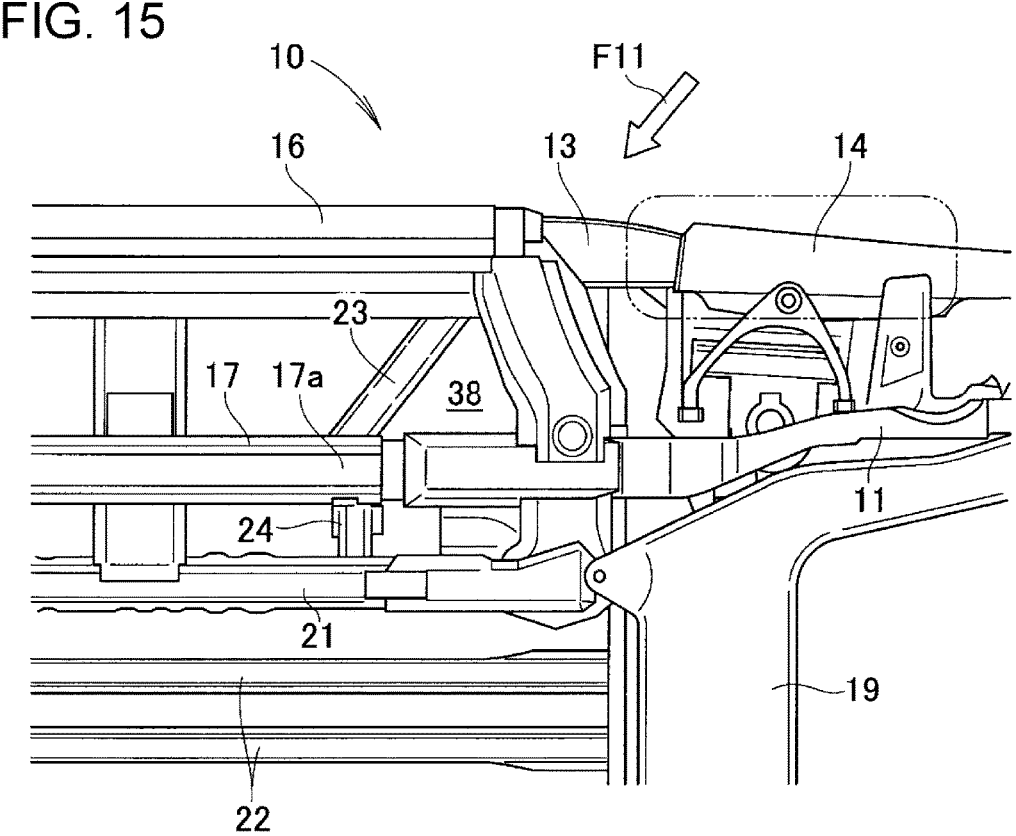
FIG. 15 is a diagram for explaining an exemplary case of how a load applied obliquely from the front side to a left front pillar of the vehicle body structure according to the first embodiment is borne.

As illustrated in FIG. 15, the left front pillar 13 is connected to the connecting portion 17a of the left floor frame 17 by the left inclined member 23a. Furthermore, the left inclined member 23 is connected, at the connecting portion 17a of the left floor frame 17, to the left tunnel side frame 21 by the left lateral member 24.

In such a state, if a load F11 is applied to the left front pillar 13 obliquely from the front side, the load F11 is borne by the left inclined member 23 and the left lateral member 24. Thus, the deformation of the left front pillar 13 toward the vehicle cabin 38 is suppressed by the left inclined member 23 and the left lateral member 24.

Now, a second embodiment will be described with reference to FIGS. 16 and 17. Elements to be described in the second embodiment that are the same as or similar to those described in the first embodiment are denoted by the same reference numerals used in the first embodiment, and detailed description thereof is omitted.

Second Embodiment

A vehicle body structure 110 according to the second embodiment will now be described.

Figure 16:
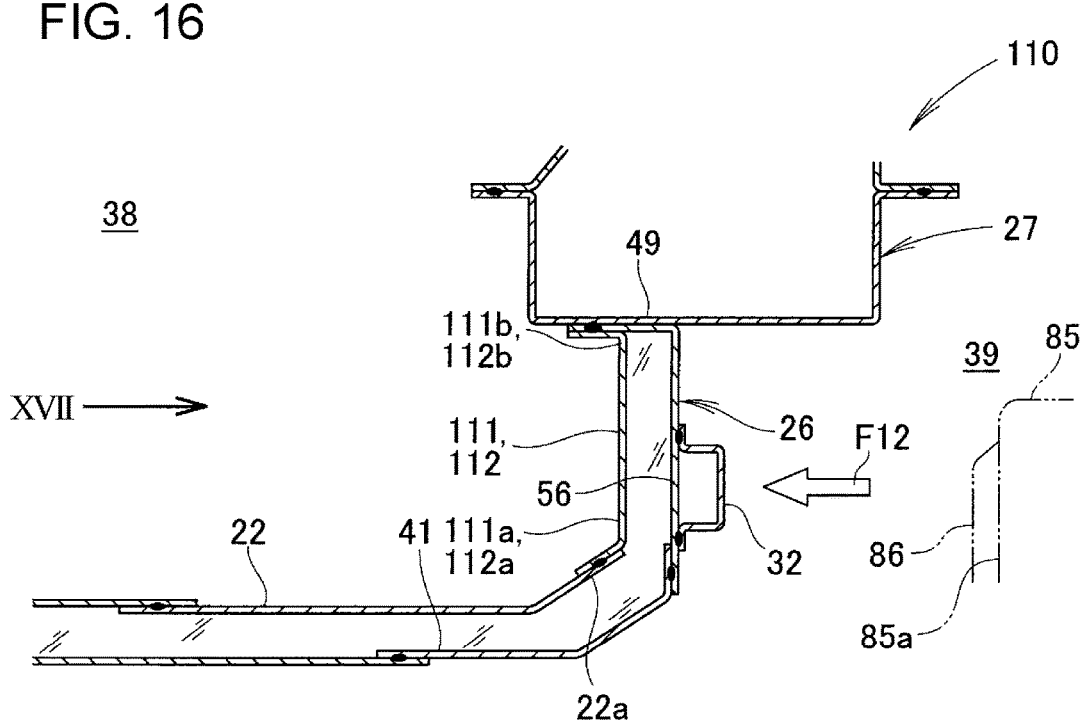
FIG. 16 is a sectional view of a vehicle body structure according to a second embodiment of the present application.
Figure 17:
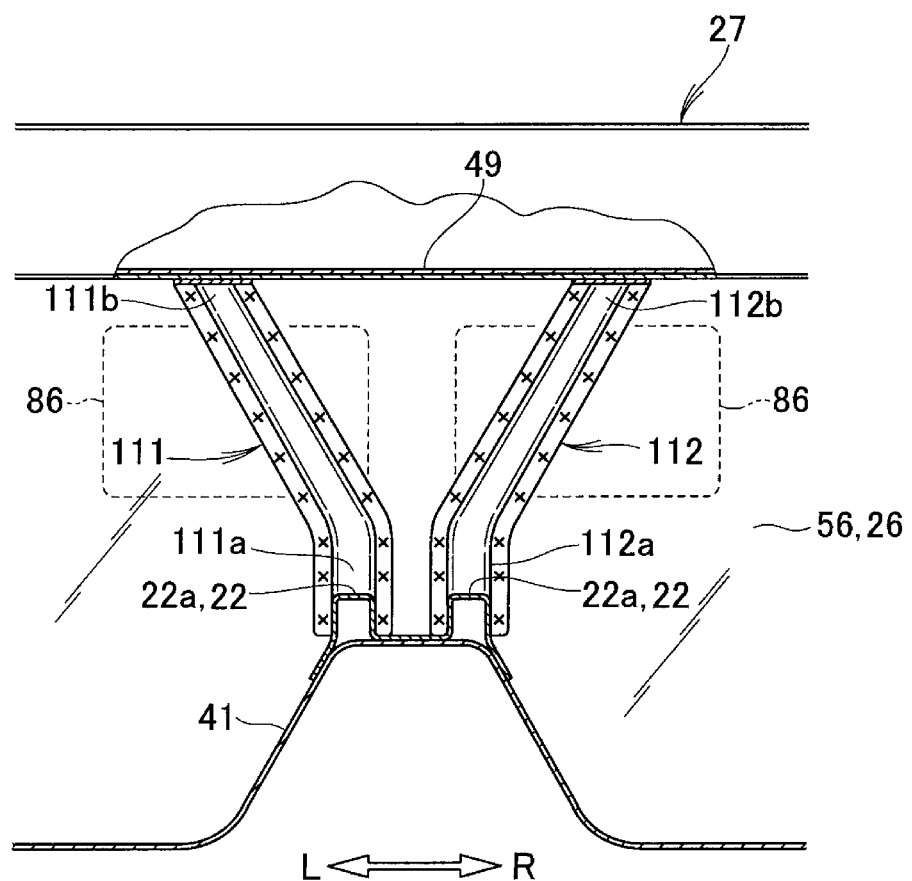
FIG. 17 illustrates a part of the vehicle body structure that is seen in a direction of arrow XVII-XVII illustrated in FIG. 16.

As illustrated in FIGS. 16 and 17, the vehicle body structure 110 includes a left dash frame 111 and a right dash frame 112 in replacement with the left dash frame 31 and the right dash frame 31 according to the first embodiment. The other elements of the vehicle body structure 110 are the same as those of the vehicle body structure 10 according to the first embodiment.

The left dash frame 111 and the right dash frame 112 are provided on the left and right sides, respectively, at an interval in the vehicle-body width direction. Specifically, the left dash frame 111 inclines from a lower end 111a to an upper end 111b toward the left side in the vehicle-body width direction.

The lower end 111a of the left dash frame 111 is joined to the front end 22a of the left tunnel frame 22, and the upper end 111b of the left dash frame 111 is joined to the upper bottom portion 49 of the dash upper panel 27.

The right dash frame 112 inclines from a lower end 112a to an upper end 112b toward the right side in the vehicle-body width direction. The lower end 112a of the right dash frame 112 is joined to the front end 22a of the right tunnel frame 22, and the upper end 112b of the right dash frame 112 is joined to the upper bottom portion 49 of the dash upper panel 27.

The lower end 111a of the left dash frame 111 and the lower end 112a of the right dash frame 112 are positioned on the left and right sides, respectively, at an interval in the vehicle-body width direction.

Furthermore, the left dash frame 111 and the right dash frame 112 diverge in the vehicle-body width direction from the lower ends 111a and 112a toward the upper bottom portion 49.

In other words, the left dash frame 111 and the right dash frame 112 diverge in the vehicle-body width direction from the respective front ends 22a of the left tunnel frame 22 and the right tunnel frame 22 toward the upper bottom portion 49.

The power source (for example, an engine) 85 provided in the engine room 39 may have projections 86 on a rear face 85a thereof, and the projections 86 may be arranged at intervals in the vehicle-body width direction or only on one of the two sides in the vehicle-body width direction.

Hence, the left dash frame 111 and the right dash frame 112 are arranged in such a manner as to diverge in the vehicle-body width direction, so that the left and right dash frames 111 and 112 can receive any projections 86 of the power source 85.

Therefore, if the power source 85 is moved rearward in an accident with front collision, the projections 86 of the power source 85 are made to bump against the left and right dash frames 111 and 112. Thus, a load F12 applied from the projections 86 of the power source 85 is borne by the left and right dash frames 111 and 112.

Note that the positions of the projections 86 of the power source 85 vary depending on the type of the power source 85. Therefore, employing the left and right dash frames 111 and 112 according to the second embodiment provides compatibility with different types of power sources 85 and widens the range of application of the vehicle body structure.

The vehicle body structure according to the present application is not limited to those described in the above embodiments and may be modified or improved according to need.

For example, while the above embodiments each concern a case where the left tire-load-bearing portion 34 has the plurality of beads 105, the present application is not limited to such a case. The left tire-load-bearing portion 34 may have only one bead 105.

Furthermore, the shapes and configurations of the elements according to the above embodiments, including the vehicle body structure, the left and right front side frames, the left and right front pillars, the left and right upper members, the left and right side sills, the left and right floor frames, the left and right tunnel side frames, the left and right tunnel frames, the left and right inclined members, the left and right lateral members, the dash lower panel, the dash upper panel, the floor panel, the left and right dash frames, the dash cross member, the left and right reinforcing members, the left and right tire-load-bearing portions, the pedal bracket, the pedal, the floor tunnel, the vertical panel portion, the inclined panel portion, the bent part, the left and right wheel arch portions, the concave parts, the center cross portion, the left and right bulkheads, and the beads, are not limited to those exemplified above and may be modified according to need.

The present application is suitably applicable to an automobile that includes a vehicle body structure in which a dash lower panel is provided between left and right front pillars and separates a vehicle cabin and an engine room from each other. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A vehicle body structure comprising:
   a dash lower panel provided between a left front pillar and a right front pillar;
   a dash upper panel provided at an upper end of the dash lower panel, wherein the dash lower panel partitions a vehicle cabin from an engine room in a vehicle-body front-back direction; and
   a floor panel provided on a vehicle cabin side of the dash lower panel, the vehicle body structure further comprising:
   a tunnel frame extending along a floor tunnel included in the floor panel to the dash lower panel;
   a dash frame extending upward from a front end of the tunnel frame to the dash upper panel along a vehicle-cabin-side surface of the dash lower panel;
   a dash cross member extending in a vehicle-body width direction to intersect the dash frame, the dash cross member being provided on an engine-room-side surface of the dash lower panel, the dash cross member bridging the left front pillar and the right front pillar;
   a front side frame provided in the engine room and extending in the vehicle-body front-back direction, the front side frame being connected to the dash cross member; and
   a bulkhead connected to the front side frame and provided in a space defined inside the dash cross member in cross-sectional view of the dash cross member.

2. The vehicle body structure according to claim 1,
   wherein the dash frame includes a pair of dash frames that are provided on left and right sides, respectively, at an interval in the vehicle-body width direction, and
   wherein the dash frames diverge in the vehicle-body width direction from the front end of the tunnel frame toward the dash upper panel.

3. The vehicle body structure according to claim 1, further comprising:
   a pedal bracket provided on the vehicle cabin side of the dash lower panel and supporting a pedal,
   wherein the dash cross member includes a center cross portion disposed at an intermediate portion in the vehicle-body width direction, the center cross portion being raised with respect to other portions of the dash cross member and overlapping a lower part of the pedal bracket with the dash lower panel interposed between the center cross portion and the lower part of the pedal bracket.

4. A vehicle comprising the vehicle body structure according to claim 1.

5. The vehicle body structure according to claim 1, further comprising:
   a side sill extending in the vehicle-body front-back direction along an outer side of the floor panel;
   a floor frame provided on an inner side of the side sill in the vehicle-body width direction and extending in the vehicle-body front-back direction along the floor panel; and
   a tunnel side frame provided between the floor frame and the tunnel frame and extending in the vehicle-body front-back direction along the floor panel,
   wherein a load that is applied to the vehicle body structure in case of an accident with front collision is transmitted to the side sill, the floor frame, the tunnel side frame, and the tunnel frame.

6. The vehicle body structure according to claim 5,
   wherein the side sill includes a left side sill and a right side sill,
   wherein the floor frame includes a left floor frame and a right floor frame,
   wherein the tunnel side frame includes a left tunnel side frame and a right tunnel side frame,
   wherein the left and right front pillars are each provided at a front end of a corresponding one of the left and right side sills, and
   wherein the vehicle body structure further includes
   an inclined member extending from each of the front pillars to a corresponding one of the floor frames while inclining toward the inner side in the vehicle-body width direction and toward a vehicle-body rear direction; and
   a lateral member extending from the inclined member to a corresponding one of the tunnel side frames toward the inner side in the vehicle-body width direction.

7. The vehicle body structure according to claim 1, wherein the front side frame includes an inner side wall and an outer side wall,
wherein the bulkhead includes a bulkhead inner side wall aligned with the inner side wall of the front side frame in the vehicle-body front-back direction, and a bulkhead outer side wall aligned with the outer side wall of the front side frame in the vehicle-body front-back direction.

8. The vehicle body structure according to claim 7, wherein the bulkhead includes a connecting wall connecting rear ends of the bulkhead inner side wall and the bulkhead outer side wall and extending substantially parallel to the dash lower panel.

9. The vehicle body structure according to claim 1, wherein the dash lower panel includes
a vertical panel portion hanging down from the dash upper panel to a front end of the floor tunnel;
an inclined panel portion extending from a lower end of the vertical panel portion to the floor panel while inclining down toward a vehicle-body rear direction; and
a bent part defined at a point where the inclined panel portion and the vertical panel portion meet, and
wherein the vehicle body structure further includes a reinforcing member provided to the dash lower panel in such a manner as to cover the bent part from the vehicle cabin side and to provide a cross-sectionally closed space in combination with the dash lower panel.

10. The vehicle body structure according to claim 9, wherein the reinforcing member extends in the vehicle-body width direction.

11. The vehicle body structure according to claim 9, wherein the dash lower panel includes a wheel arch portion that bulges toward the vehicle cabin in such a manner as to avoid a wheel, and
a tire-load-bearing portion provided to the wheel arch portion and integrated with the reinforcing member.

12. The vehicle body structure according to claim 11, wherein the tire-load-bearing portion includes a bead that bulges toward the engine room, and
wherein the wheel arch portion includes a concave part that is recessed toward the engine room and in which the bead is contained.

13. The vehicle body structure according to claim 11, wherein an upper part of the tire-load-bearing portion overlaps the dash cross member with the wheel arch portion interposed between the tire-load-bearing portion and the dash cross member.

14. A vehicle body structure comprising:
a dash lower panel provided between a left front pillar and a right front pillar;
a dash upper panel provided at an upper end of the dash lower panel, wherein the dash lower panel partitions a vehicle cabin from an engine room in a vehicle-body front-back direction; and
a floor panel provided on a vehicle cabin side of the dash lower panel, the vehicle body structure further comprising:
a tunnel frame extending along a floor tunnel included in the floor panel to the dash lower panel;
a dash frame extending upward from a front end of the tunnel frame to the dash upper panel along a vehicle-cabin-side surface of the dash lower panel;
a dash cross member extending in a vehicle-body width direction to intersect the dash frame, the dash cross member being provided on an engine-room-side surface of the dash lower panel, the dash cross member bridging the left front pillar and the right front pillar,
wherein the dash lower panel includes
a vertical panel portion hanging down from the dash upper panel to a front end of the floor tunnel;
an inclined panel portion extending from a lower end of the vertical panel portion to the floor panel while inclining down toward a vehicle-body rear direction; and
a bent part defined at a point where the inclined panel portion and the vertical panel portion meet, and
wherein the vehicle body structure further includes a reinforcing member provided to the dash lower panel in such a manner as to cover the bent part from the vehicle cabin side and to provide a cross-sectionally closed space in combination with the dash lower panel.

15. The vehicle body structure according to claim 14, wherein the reinforcing member extends in the vehicle-body width direction.

16. The vehicle body structure according to claim 14, wherein the dash lower panel includes a wheel arch portion that bulges toward the vehicle cabin in such a manner as to avoid a wheel, and
a tire-load-bearing portion provided to the wheel arch portion and integrated with the reinforcing member.

17. The vehicle body structure according to claim 16, wherein the tire-load-bearing portion includes a bead that bulges toward the engine room, and
wherein the wheel arch portion includes a concave part that is recessed toward the engine room and in which the bead is contained.

18. The vehicle body structure according to claim 16, wherein an upper part of the tire-load-bearing portion overlaps the dash cross member with the wheel arch portion interposed between the tire-load-bearing portion and the dash cross member.

19. A vehicle body structure comprising:
a dash lower panel provided between a left front pillar and a right front pillar;
a dash upper panel provided at an upper end of the dash lower panel, wherein the dash lower panel partitions a vehicle cabin from an engine room in a vehicle-body front-back direction; and
a floor panel provided on a vehicle cabin side of the dash lower panel, the vehicle body structure further comprising:
a tunnel frame extending along a floor tunnel included in the floor panel to the dash lower panel;
a dash frame extending upward from a front end of the tunnel frame to the dash upper panel along a vehicle-cabin-side surface of the dash lower panel;
a dash cross member extending in a vehicle-body width direction to intersect the dash frame, the dash cross member being provided on an engine-room-side surface of the dash lower panel, the dash cross member bridging the left front pillar and the right front pillar; and
a pedal bracket provided on the vehicle cabin side of the dash lower panel and supporting a pedal,
wherein the dash cross member includes a center cross portion disposed at an intermediate portion in the vehicle-body width direction, the center cross portion being raised with respect to other portions of the dash cross member and overlapping a lower part of the pedal bracket with the dash lower panel interposed between the center cross portion and the lower part of the pedal bracket.

20. A vehicle body structure comprising:
a dash lower panel provided between a left front pillar and a right front pillar;
a dash upper panel provided at an upper end of the dash lower panel, wherein the dash lower panel partitions a vehicle cabin from an engine room in a vehicle-body front-back direction; and
a floor panel provided on a vehicle cabin side of the dash lower panel, the vehicle body structure further comprising:
a tunnel frame extending along a floor tunnel included in the floor panel to the dash lower panel;
a dash frame extending upward from a front end of the tunnel frame to the dash upper panel along a vehicle-cabin-side surface of the dash lower panel;
a dash cross member extending in a vehicle-body width direction to intersect the dash frame, the dash cross member being provided on an engine-room-side surface of the dash lower panel, the dash cross member bridging the left front pillar and the right front pillar;
a side sill extending in the vehicle-body front-back direction along an outer side of the floor panel;
a floor frame provided on an inner side of the side sill in the vehicle-body width direction and extending in the vehicle-body front-back direction along the floor panel; and
a tunnel side frame provided between the floor frame and the tunnel frame and extending in the vehicle-body front-back direction along the floor panel,
wherein a load that is applied to the vehicle body structure in case of an accident with front collision is transmitted to the side sill, the floor frame, the tunnel side frame, and the tunnel frame,
wherein the side sill includes a left side sill and a right side sill,
wherein the floor frame includes a left floor frame and a right floor frame,
wherein the tunnel side frame includes a left tunnel side frame and a right tunnel side frame,
wherein the left and right front pillars are each provided at a front end of a corresponding one of the left and right side sills, and
wherein the vehicle body structure further includes
an inclined member extending from each of the front pillars to a corresponding one of the floor frames while inclining toward the inner side in the vehicle-body width direction and toward a vehicle-body rear direction; and
a lateral member extending from the inclined member to a corresponding one of the tunnel side frames toward the inner side in the vehicle-body width direction.

* * * * *